United States Patent
Wexler et al.

(10) Patent No.: US 10,851,925 B2
(45) Date of Patent: Dec. 1, 2020

(54) FITTINGS FOR COMPRESSED GAS STORAGE VESSELS

(71) Applicant: Other Lab, LLC, San Francisco, CA (US)

(72) Inventors: Jason Stein Wexler, San Francisco, CA (US); Kevin Kai Morris, Tiburon, CA (US); Jamie Marie-LoBue Shilling, San Francisco, CA (US)

(73) Assignee: OTHER LAB, LLC, San Francisco, CA (US)

( * ) Notice: Subject to any disclaimer, the term of this patent is extended or adjusted under 35 U.S.C. 154(b) by 317 days.

(21) Appl. No.: 15/792,090

(22) Filed: Oct. 24, 2017

(65) Prior Publication Data
US 2018/0111475 A1   Apr. 26, 2018

Related U.S. Application Data

(60) Provisional application No. 62/412,044, filed on Oct. 24, 2016.

(51) Int. Cl.
*F16L 33/207*   (2006.01)
*F16L 11/08*    (2006.01)
(Continued)

(52) U.S. Cl.
CPC .......... *F16L 33/2076* (2013.01); *B60K 15/01* (2013.01); *B60K 15/013* (2013.01);
(Continued)

(58) Field of Classification Search
CPC . F16L 33/2076; F16L 33/2073; F16L 11/085; F17C 13/083; F17C 13/04;
(Continued)

(56) References Cited

U.S. PATENT DOCUMENTS

| | | | |
|---|---|---|---|
| 2,025,038 A | 12/1935 | Cannon | |
| 2,380,372 A | 7/1945 | Alderfer | |

(Continued)

FOREIGN PATENT DOCUMENTS

| | | |
|---|---|---|
| CA | 2636100 A1 | 12/2009 |
| CN | 1036534 A | 10/1989 |

(Continued)

OTHER PUBLICATIONS

International Search Report and Written Opinion dated Aug. 27, 2013, International Patent Application No. PCT/US2013/039565, filed May 3, 2013, 13 pages.

(Continued)

*Primary Examiner* — Zachary T Dragicevich
(74) *Attorney, Agent, or Firm* — Davis Wright Tremaine LLP

(57) ABSTRACT

A set of fittings for a fuel tank including an elongated stem and a ferrule. The stem includes an elongated coupling body at one end configured to couple within a cavity defined by an end of a fuel tank liner. The ferrule includes a ferrule body having a first ferrule end and a second ferrule end; a lip defining a coupling orifice at the first ferrule end with the stem being operable to extend though the coupling orifice and engaging the lip, and a ferrule cavity defined by the ferrule body that extends between the first and second ferrule ends and opening to the coupling orifice at the first ferrule end and a ferrule opening at the second ferrule end, the ferrule cavity configured to surround the end of the fuel tank liner.

17 Claims, 28 Drawing Sheets

(51) Int. Cl.

| | | |
|---|---|---|
| *B60K 15/01* | (2006.01) | |
| *F17C 13/04* | (2006.01) | |
| *F17C 13/08* | (2006.01) | |
| *B60K 15/03* | (2006.01) | |
| *F17C 1/00* | (2006.01) | |
| *F17C 1/16* | (2006.01) | |

(52) U.S. Cl.
CPC ...... *B60K 15/03006* (2013.01); *F16L 11/085* (2013.01); *F17C 1/005* (2013.01); *F17C 1/16* (2013.01); *F17C 13/04* (2013.01); *F17C 13/083* (2013.01); *B60K 2015/03315* (2013.01); *F17C 2201/0104* (2013.01); *F17C 2201/0109* (2013.01); *F17C 2201/0123* (2013.01); *F17C 2201/0138* (2013.01); *F17C 2201/0166* (2013.01); *F17C 2201/0195* (2013.01); *F17C 2201/054* (2013.01); *F17C 2201/056* (2013.01); *F17C 2203/0604* (2013.01); *F17C 2203/0619* (2013.01); *F17C 2203/0636* (2013.01); *F17C 2203/0646* (2013.01); *F17C 2203/0663* (2013.01); *F17C 2205/0107* (2013.01); *F17C 2205/0142* (2013.01); *F17C 2205/0305* (2013.01); *F17C 2205/037* (2013.01); *F17C 2205/0332* (2013.01); *F17C 2205/0361* (2013.01); *F17C 2205/0373* (2013.01); *F17C 2209/224* (2013.01); *F17C 2209/228* (2013.01); *F17C 2221/012* (2013.01); *F17C 2223/0123* (2013.01); *F17C 2223/0161* (2013.01); *F17C 2270/0178* (2013.01)

(58) Field of Classification Search
CPC .... F17C 1/16; F17C 1/005; F17C 2203/0604; F17C 2209/228; F17C 2203/0663; F17C 2205/0373; F17C 2201/054; F17C 2223/0161; F17C 2205/037; F17C 2209/224; F17C 2201/0195; F17C 2203/0646; F17C 2205/0107; F17C 2205/0142; F17C 2203/0619; F17C 2205/0305; F17C 2201/0109; F17C 2221/012; F17C 2201/056; F17C 2201/0166; F17C 2201/0138; F17C 2205/0361; F17C 2270/0178; F17C 2223/0123; F17C 2205/0332; F17C 2203/0636; F17C 2201/0123; F17C 2201/0104; B60K 15/013; B60K 15/01; B60K 15/03006; B60K 2015/03315
USPC ......... 285/222.1, 222.2, 222.3, 222.4, 222.5, 285/239, 242, 256
See application file for complete search history.

(56) References Cited

U.S. PATENT DOCUMENTS

| | | | |
|---|---|---|---|
| 3,579,402 A | 5/1971 | Goldsworthy | |
| 3,643,813 A | 2/1972 | Noonan | |
| 4,139,019 A | 2/1979 | Bresie et al. | |
| 4,253,454 A | 3/1981 | Warncke | |
| 4,432,302 A | 2/1984 | Farris et al. | |
| 4,901,870 A | 2/1990 | Wright et al. | |
| 4,932,403 A | 6/1990 | Scholley | |
| 5,036,845 A | 8/1991 | Scholley | |
| 5,040,933 A | 8/1991 | Lee et al. | |
| 5,123,547 A | 6/1992 | Koch | |
| 5,127,307 A | 7/1992 | Pimpis | |
| 5,653,358 A | 8/1997 | Sneddon | |
| 5,830,400 A | 11/1998 | Huvey et al. | |
| 5,839,383 A | 11/1998 | Stenning et al. | |
| 6,047,860 A | 4/2000 | Sanders | |
| 6,116,464 A | 9/2000 | Sanders | |
| 6,293,590 B1 | 9/2001 | Ogasa | |
| 6,453,920 B1 | 9/2002 | Izuchukwu et al. | |
| 6,494,497 B1* | 12/2002 | Kertesz | 285/222.1 |
| 6,513,523 B1 | 2/2003 | Izuchukwu et al. | |
| 6,527,075 B1 | 3/2003 | Izuchukwu et al. | |
| 6,579,401 B1 | 6/2003 | Izuchukwu et al. | |
| 6,676,159 B1 | 1/2004 | Sellergren | |
| 7,080,864 B2 | 7/2006 | Casteran | |
| 7,494,308 B2 | 2/2009 | Chun | |
| 7,757,727 B2 | 7/2010 | Handa | |
| 8,308,407 B2 | 11/2012 | Praud | |
| 9,217,538 B2 | 12/2015 | Griffith et al. | |
| 9,279,541 B2 | 3/2016 | Cohen | |
| 9,850,852 B2 | 12/2017 | Kondogiani et al. | |
| 10,219,621 B2 | 3/2019 | Wilhelmsen | |
| 10,472,145 B2 | 11/2019 | Lu | |
| 2004/0145091 A1 | 7/2004 | Willig et al. | |
| 2004/0216656 A1 | 11/2004 | Fitzpatrick et al. | |
| 2004/0250871 A1 | 12/2004 | Bingham et al. | |
| 2004/0256016 A1 | 12/2004 | Arima et al. | |
| 2005/0205137 A1 | 9/2005 | Pouchkarev | |
| 2006/0006645 A1* | 1/2006 | Mukawa | F16L 11/085 285/256 |
| 2007/0075085 A1 | 4/2007 | Arnold et al. | |
| 2007/0221281 A1* | 9/2007 | Takagi | F16L 11/085 |
| 2008/0098562 A1 | 5/2008 | Tagliaferri et al. | |
| 2009/0308475 A1 | 12/2009 | Stringfellow et al. | |
| 2010/0075200 A1 | 3/2010 | Hatta | |
| 2011/0041518 A1 | 2/2011 | Peterson et al. | |
| 2012/0161434 A1* | 6/2012 | Wells | F16L 33/2073 285/222.3 |
| 2013/0092311 A1 | 4/2013 | Kobayashi | |
| 2013/0092561 A1 | 4/2013 | Wellnitz | |
| 2013/0125740 A1 | 5/2013 | Kang et al. | |
| 2013/0154257 A1* | 6/2013 | Ault | F16L 33/2073 285/256 |
| 2013/0299503 A1 | 11/2013 | Griffith et al. | |
| 2014/0305951 A1 | 10/2014 | Griffith et al. | |
| 2015/0034233 A1 | 2/2015 | Hatta et al. | |
| 2015/0048095 A1 | 2/2015 | Sanders | |
| 2015/0177172 A1* | 6/2015 | Upasani | F16L 33/2076 |
| 2015/0308621 A1 | 10/2015 | Mathison | |
| 2016/0018057 A1 | 1/2016 | Griffith et al. | |
| 2016/0363265 A1 | 12/2016 | Griffith et al. | |
| 2017/0145961 A1 | 5/2017 | Myers et al. | |
| 2017/0159862 A1* | 6/2017 | Vizzarri | F16L 33/2076 |
| 2018/0029465 A1 | 2/2018 | Abd Elhamid et al. | |
| 2018/0080609 A1 | 3/2018 | Abd Elhamid et al. | |
| 2018/0111302 A1 | 4/2018 | Kondogiani et al. | |
| 2019/0264839 A1* | 8/2019 | Powell | F16L 33/2076 |

FOREIGN PATENT DOCUMENTS

| | | |
|---|---|---|
| CN | 1231639 A | 10/1999 |
| CN | 2416338 Y | 1/2001 |
| CN | 1306173 A | 8/2001 |
| CN | 2542907 Y | 4/2003 |
| CN | 1518511 A | 8/2004 |
| EP | 0767338 A2 | 4/1997 |
| EP | 2404872 A1 | 1/2012 |
| EP | 3141793 A1 | 3/2017 |
| JP | 2005-265138 A | 9/2005 |
| JP | 2005337272 A | 12/2005 |
| JP | 2010-167695 A | 8/2010 |
| RU | 42863 U1 | 12/2004 |
| RU | 81568 U1 | 3/2009 |
| RU | 2426024 C2 | 8/2011 |
| RU | 141427 U1 | 6/2014 |
| WO | 9012982 A1 | 11/1990 |
| WO | 9814362 A1 | 4/1998 |
| WO | 200195967 A1 | 12/2001 |
| WO | 2001095966 A1 | 12/2001 |
| WO | 0239010 A2 | 5/2002 |
| WO | 2008081401 A1 | 7/2008 |
| WO | 2010107317 A1 | 9/2010 |

(56) References Cited

FOREIGN PATENT DOCUMENTS

| WO | 2013056785 A2 | 4/2013 |
|----|---------------|--------|
| WO | 2013166452 A1 | 11/2013 |
| WO | 2014123928 A1 | 8/2014 |

OTHER PUBLICATIONS

International Search Report and Written Opinion dated Feb. 21, 2018, International Patent Application No. PCT/US2017/058068, filed Oct. 24, 2017, 8 pages.

International Search Report and Written Opinion dated Jun. 21, 2018, International Patent Application No. PCT/US2018/025280, filed Mar. 29, 2018, 7 pages.

International Search Report and Written Opinion dated Jun. 28, 2018, International Patent Application No. PCT/US2018/025283, filed Mar. 29, 2018, 8 pages.

International Search Report and Written Opinion dtaed Mar. 16, 2017, International Patent Application No. PCT/US2016/064796, filed Dec. 2, 2016, six pages.

International Search Report and Written Opinion dated Mar. 23, 2017, International Patent Application No. PCT/US2016/037633, eight pages.

International Search Report and Written Opinion dated May 14, 2014, International Patent Application No. PCT/US2014/014729, filed Feb. 4, 2014, 11 pages.

DeMiguel et al., "The role of initial tank temperature on refuelling of on-board hydrogen tanks," Nov. 20, 2015, available online Apr. 22, 2016, retrieved Jul. 18, 2019, from https://www.sciencedirect.com/science/article/piii/S0360319915315391, 10 pages.

Reddi et al., "Impact of hydrogen SAE J2601 fueling methods on fueling time of light-duty fuel cell electric vehicles," May 16, 2017, retrieved Jul. 18, 2019, from https://www.osti.gov/servlets/purl/1389635, 23 pages.

Schneider, "SAE J2601—Worldwide Hydrogen Fueling Protocol: Status, Standardization & Implementation," Jul. 10, 2012, retrieved Jul. 18, 2019, from https://ww2.energy.ca.gov/contracts/notices/2012-07-10_workshop/presentations/SAE_Jesse_Schneider_Fueling_Protocol.pdf, 32 pages.

Guyader et al., "Analysis of 2D and 3D circular braiding processes: Modeling the interaction between the process parameters and preform architecture," Mechanism and Machine Theory 69(1):90-104, Nov. 1, 2013.

* cited by examiner

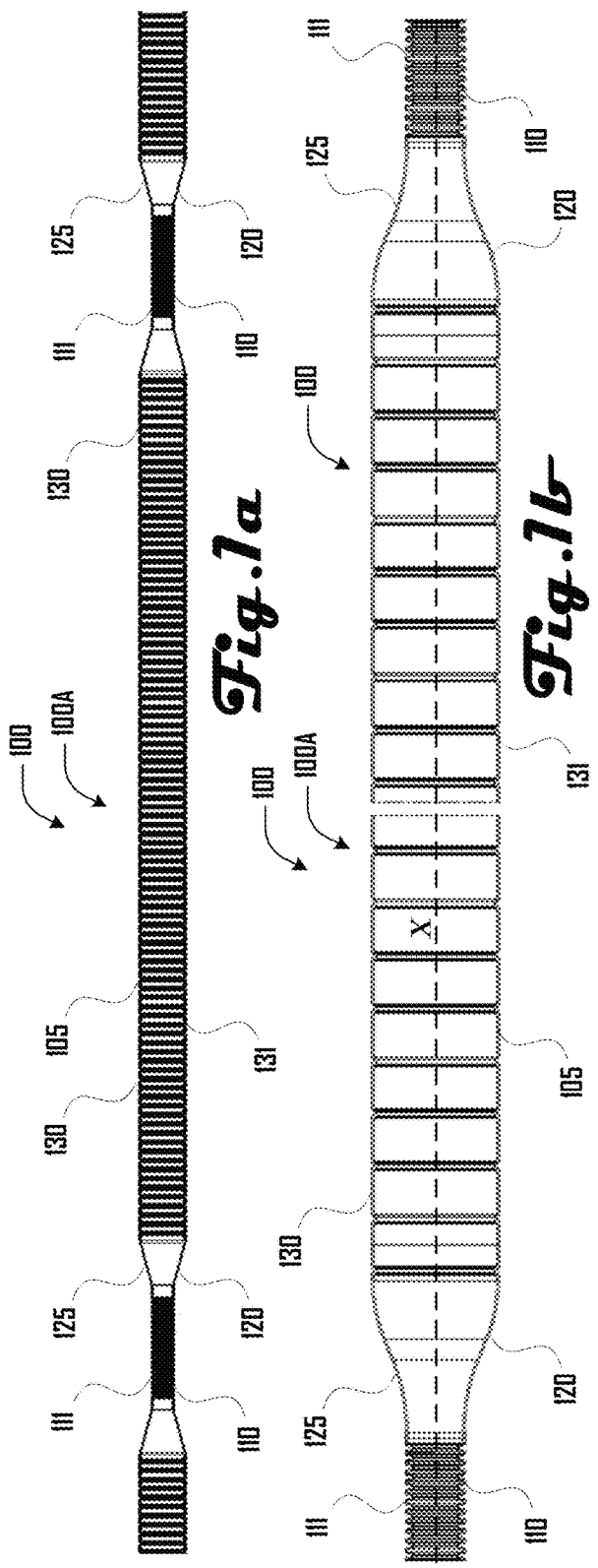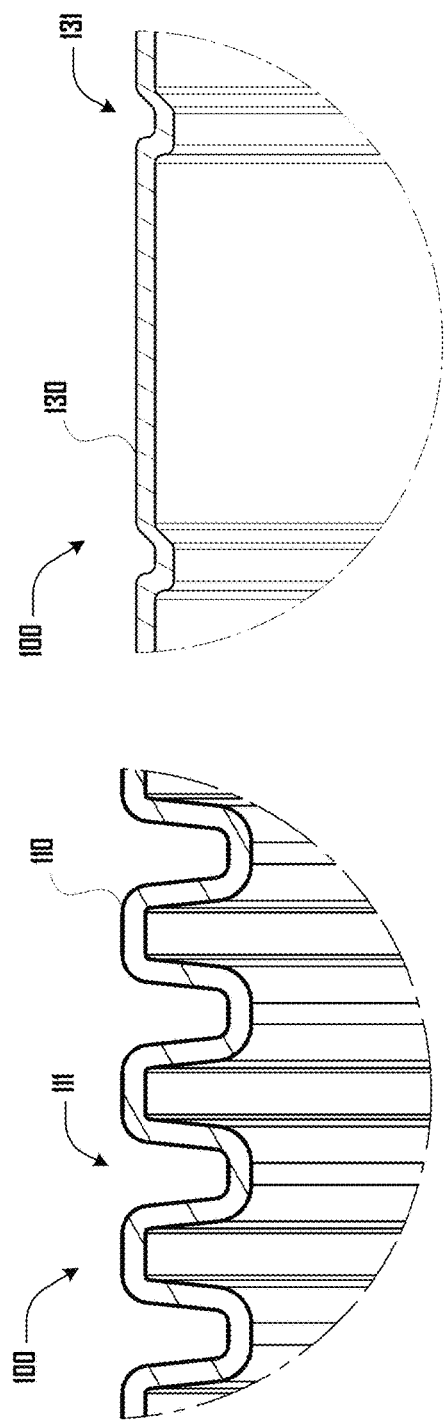

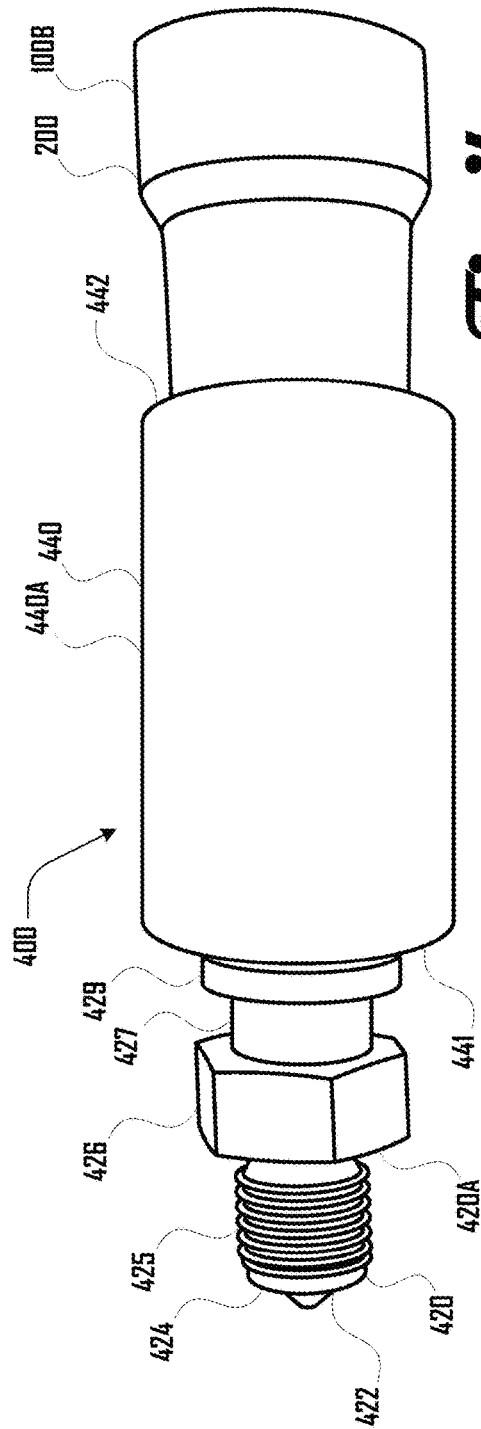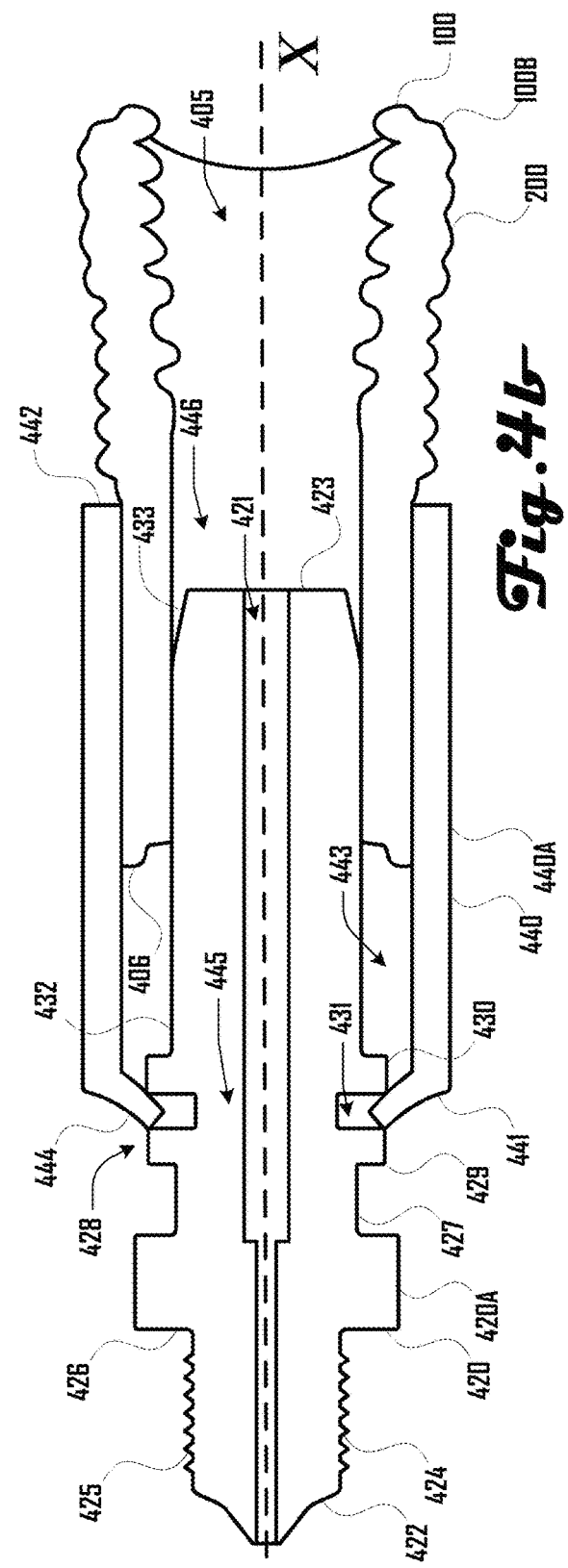

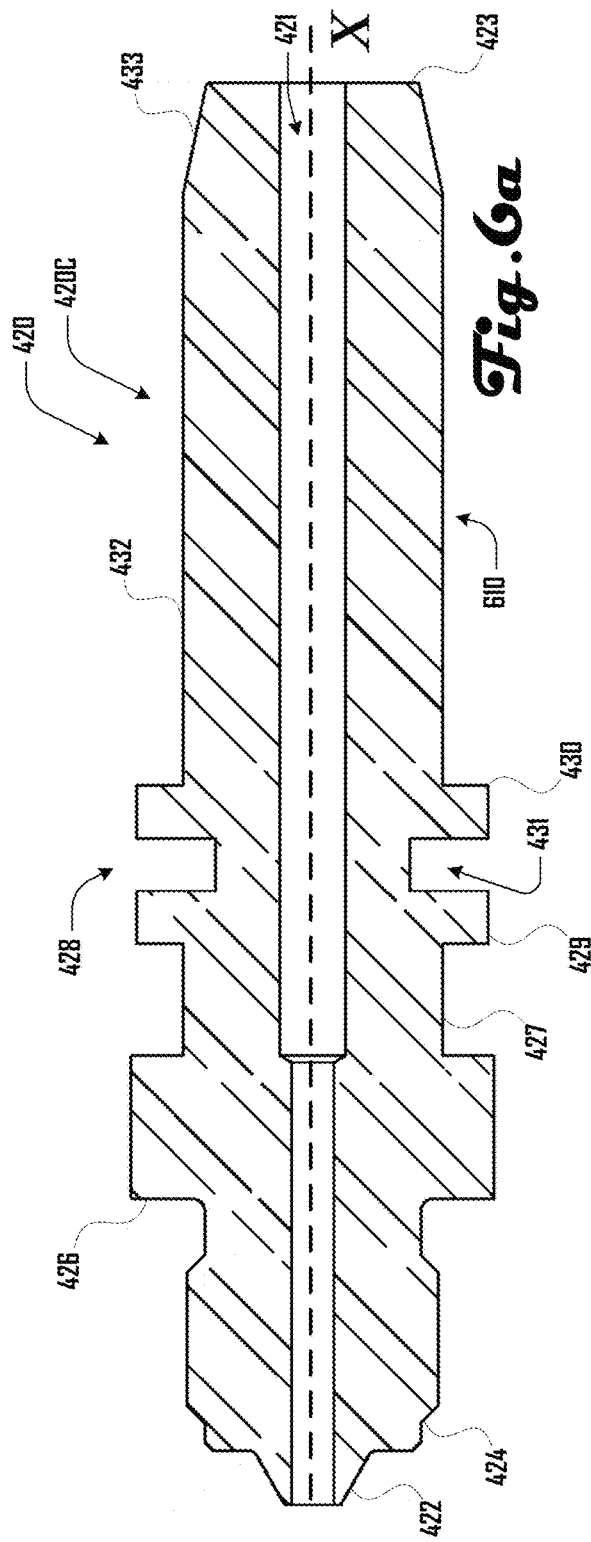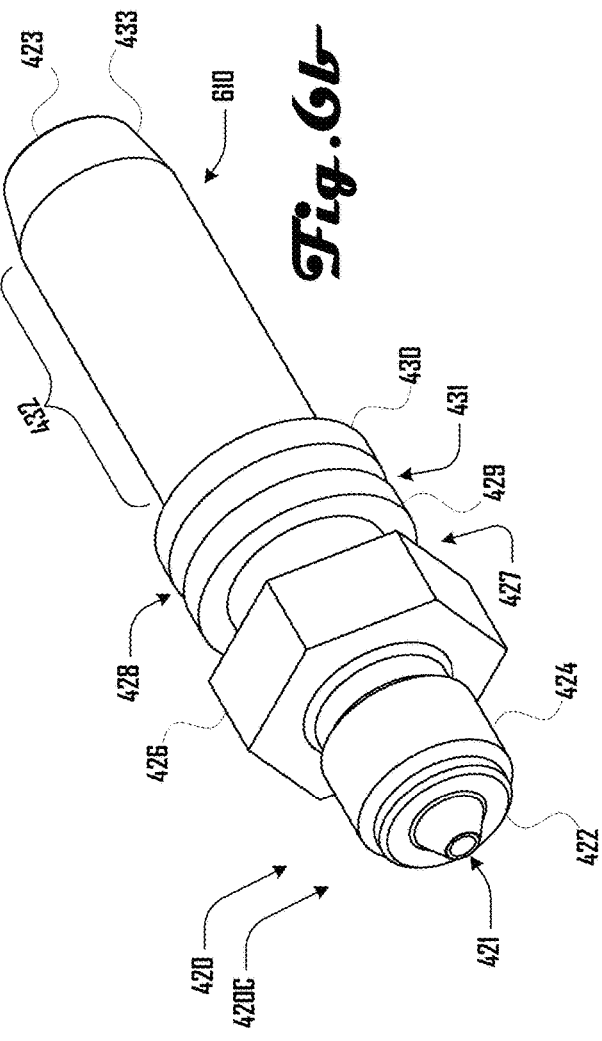

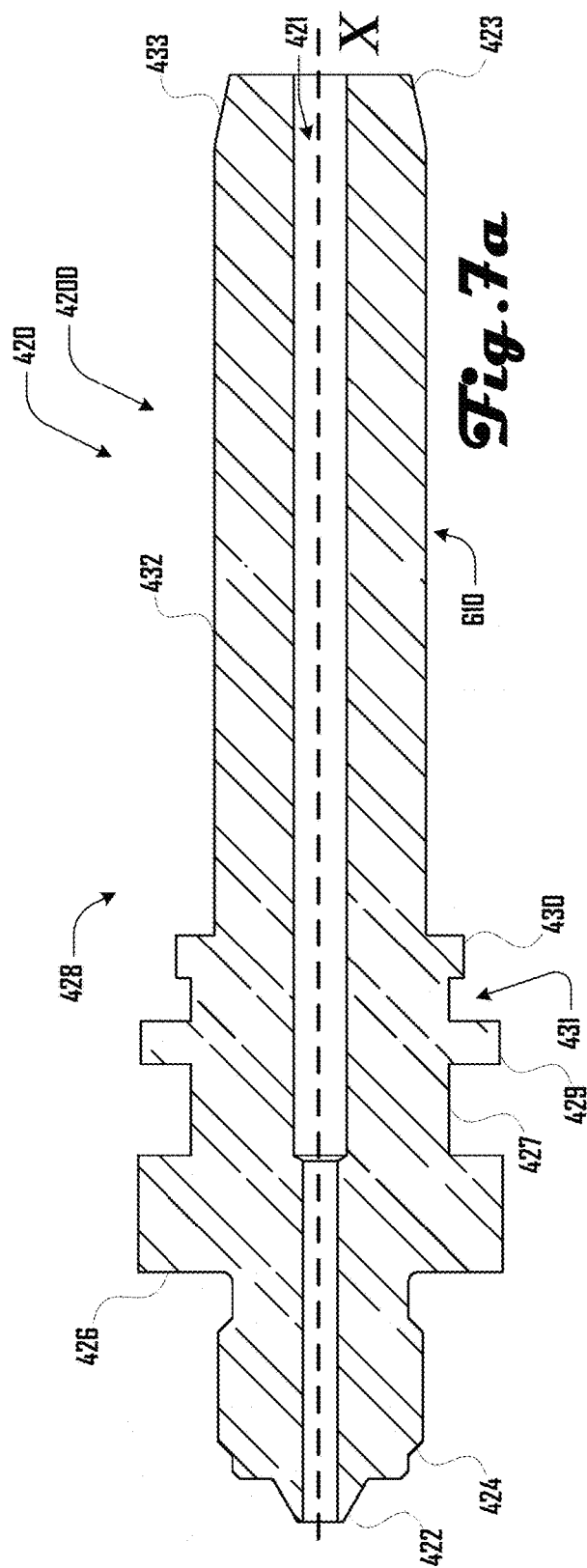
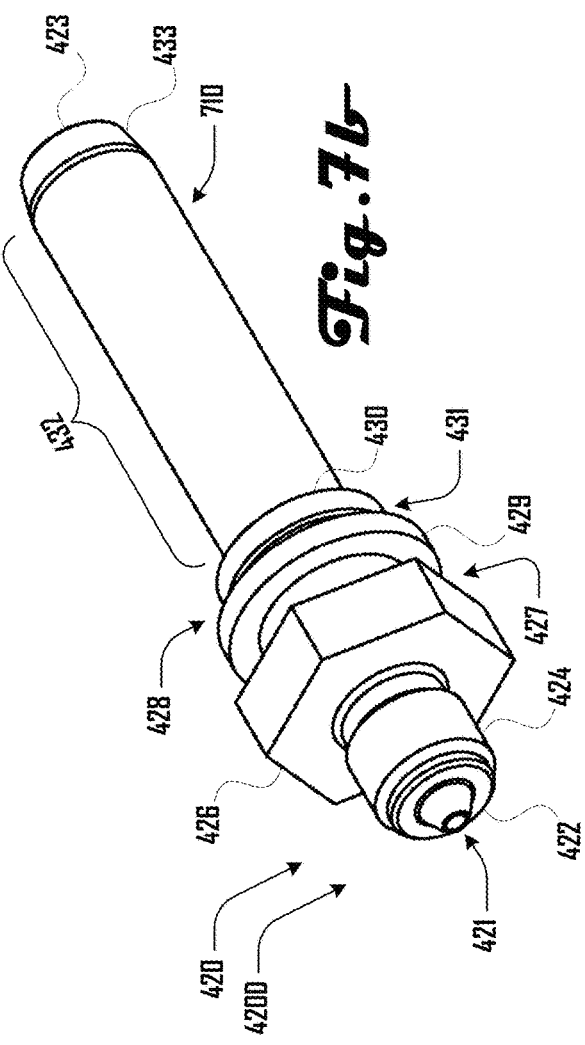

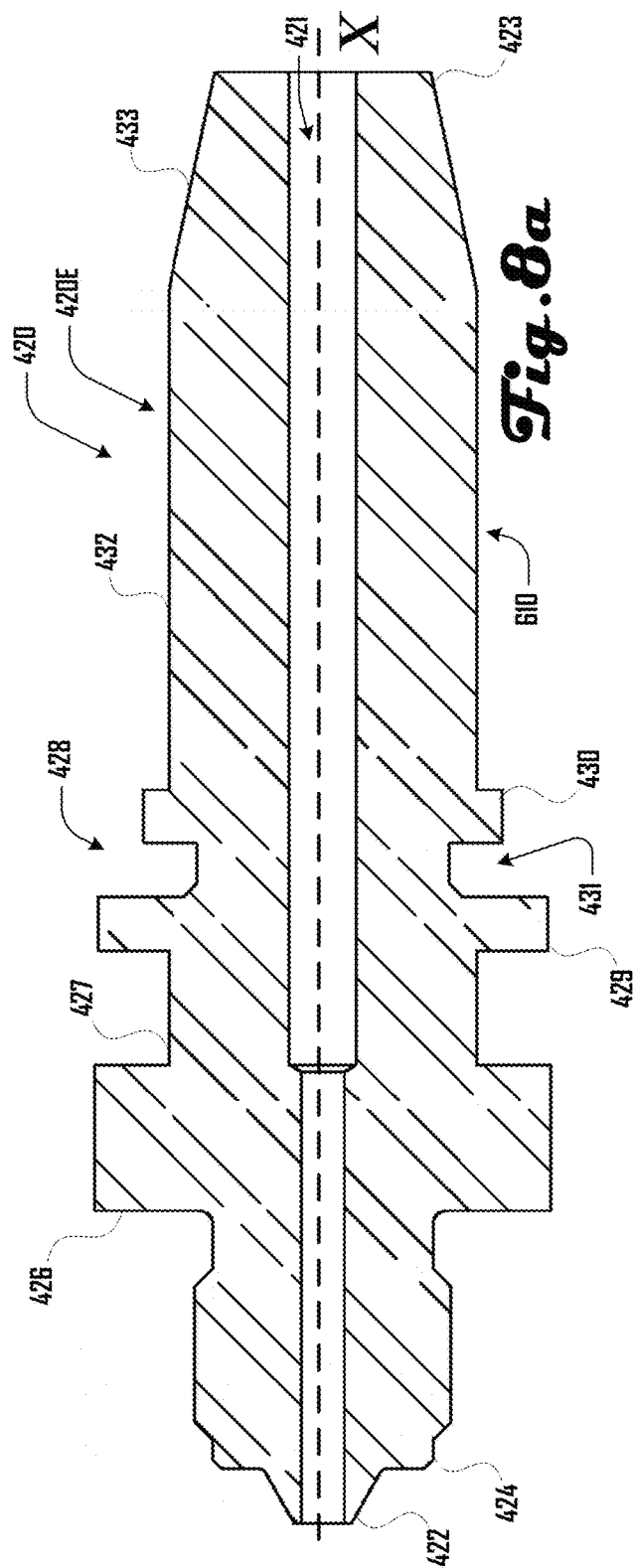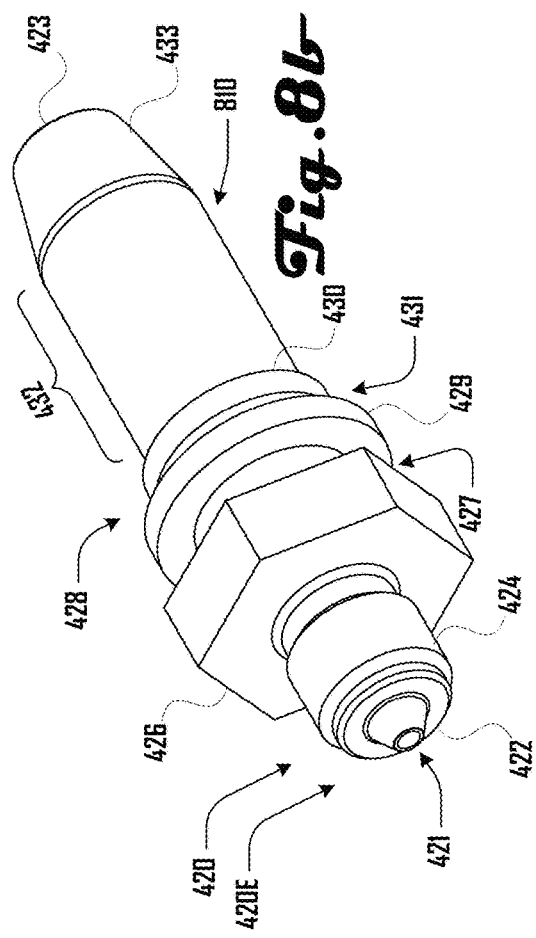

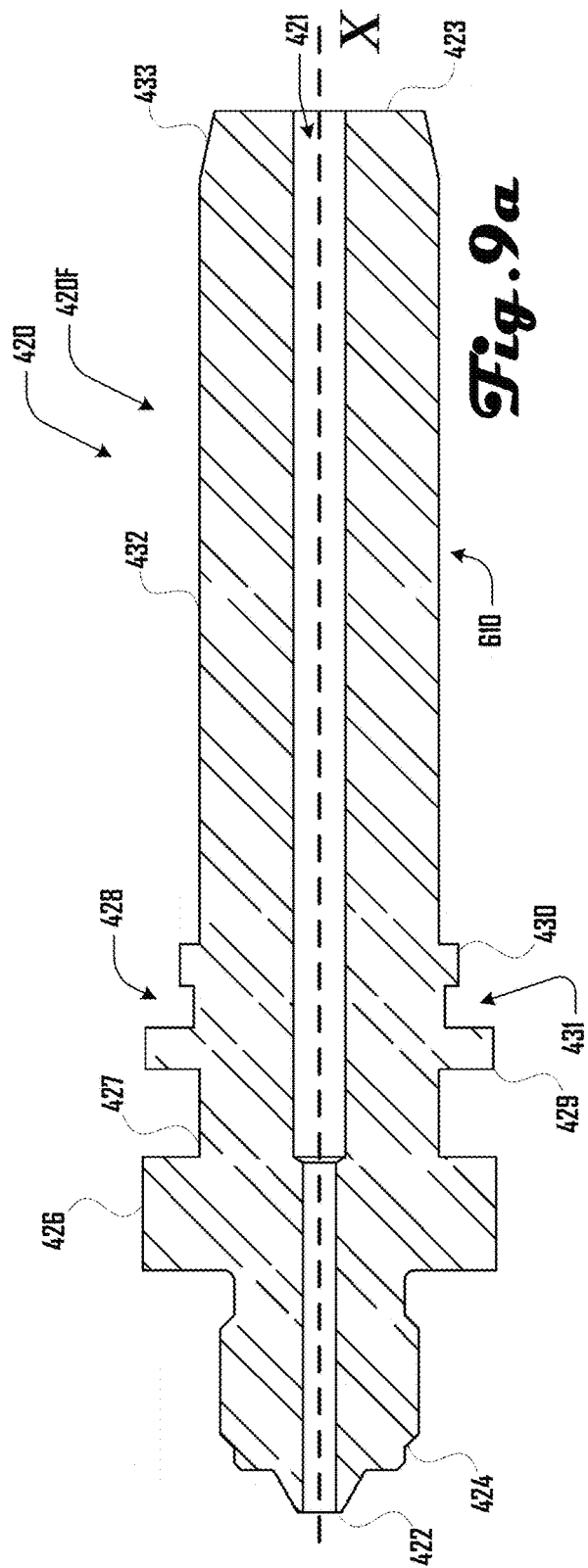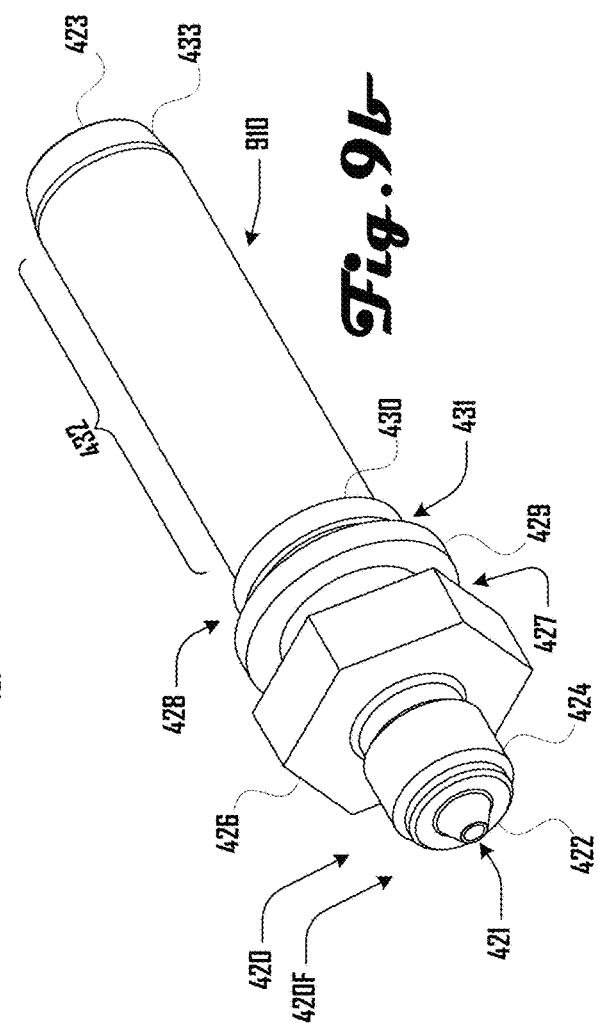

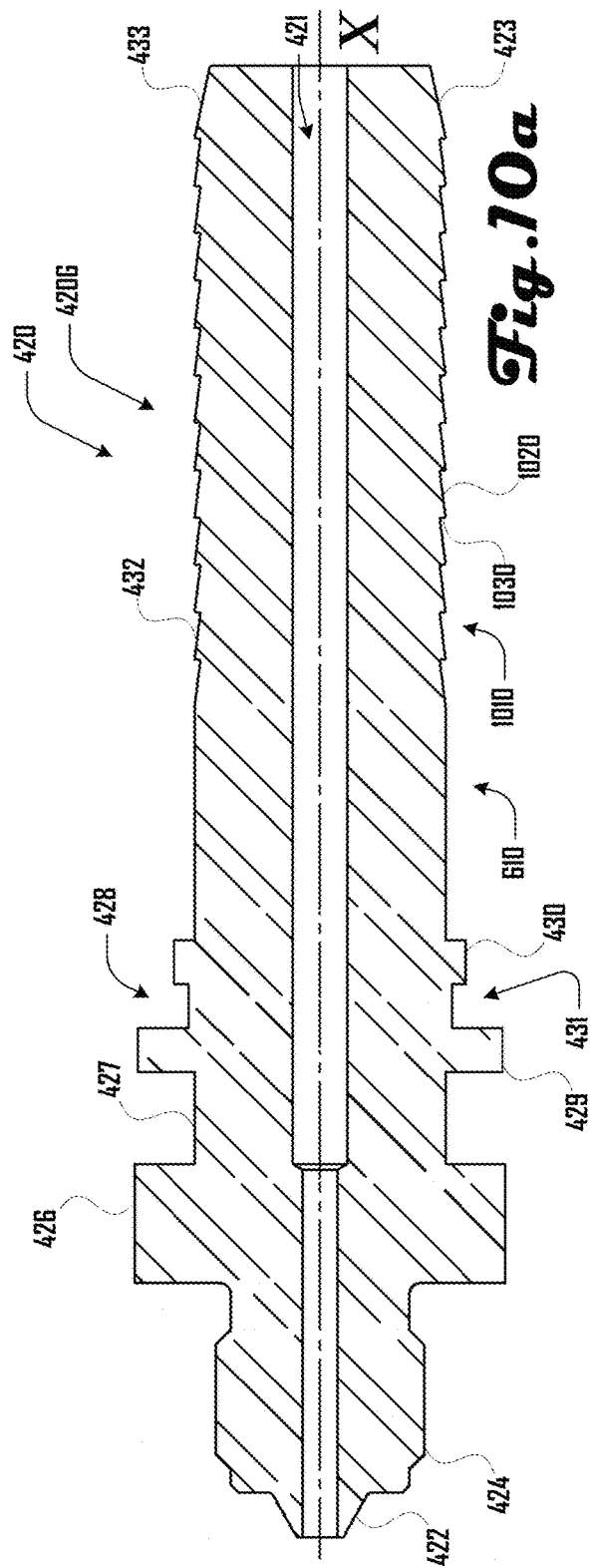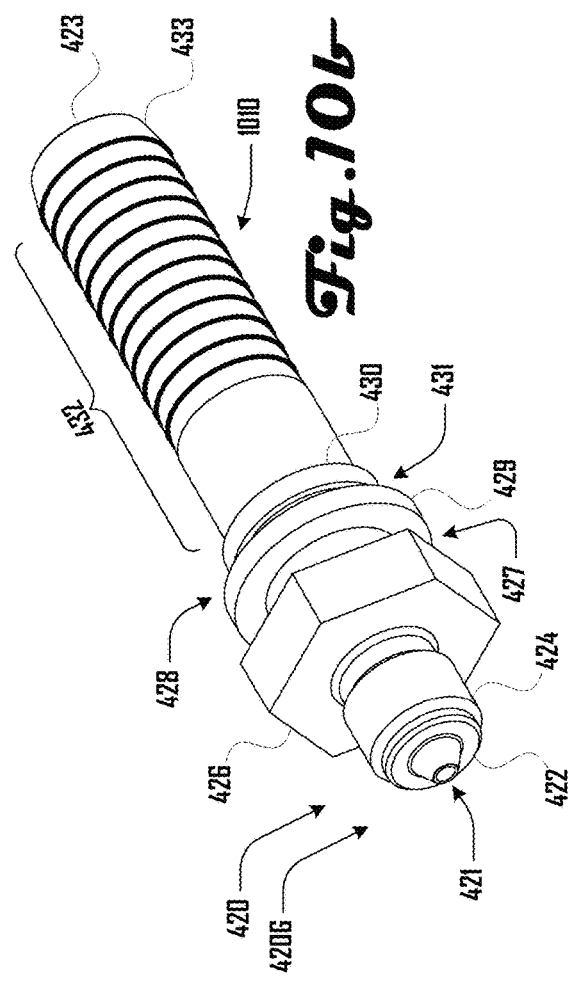

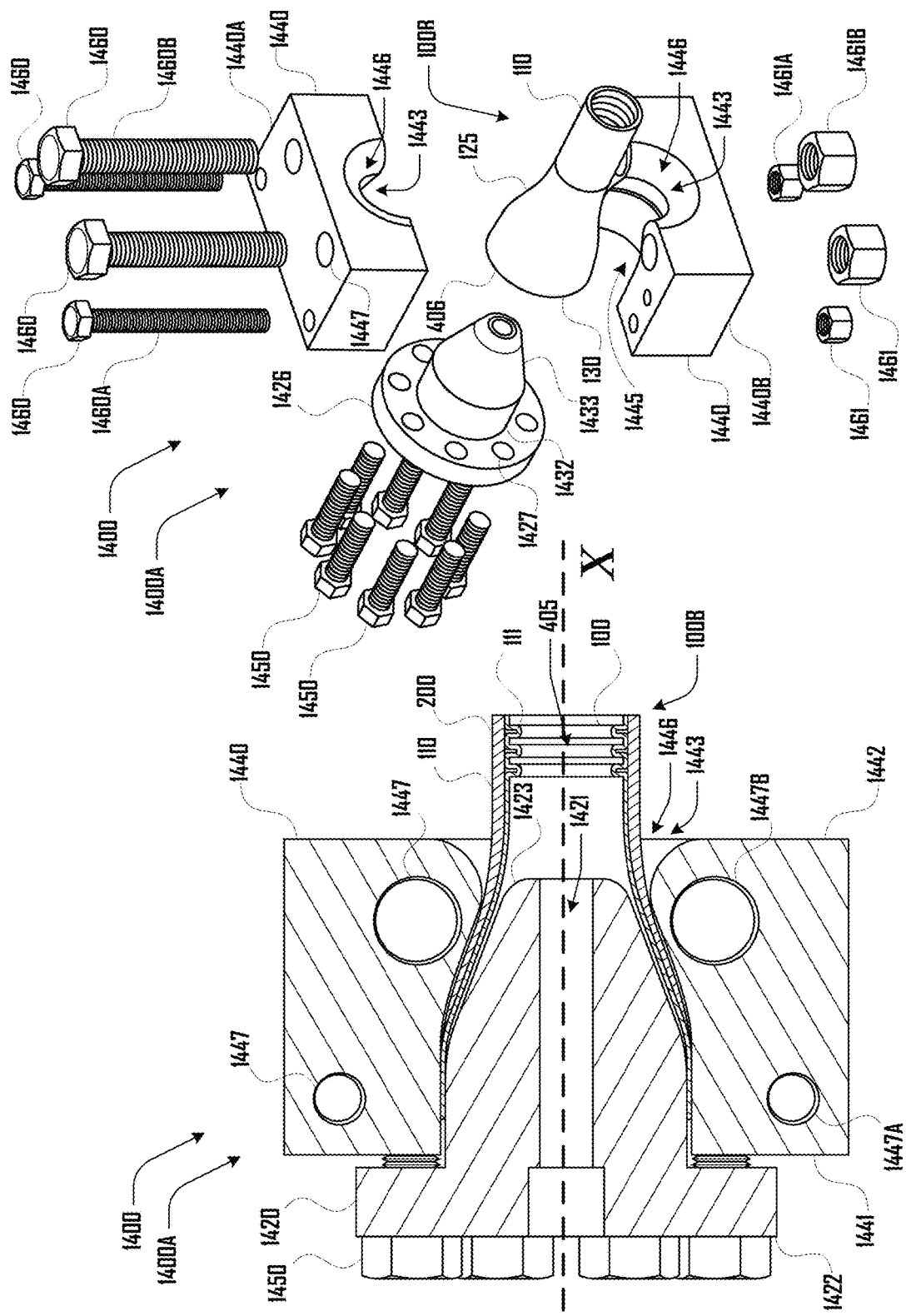

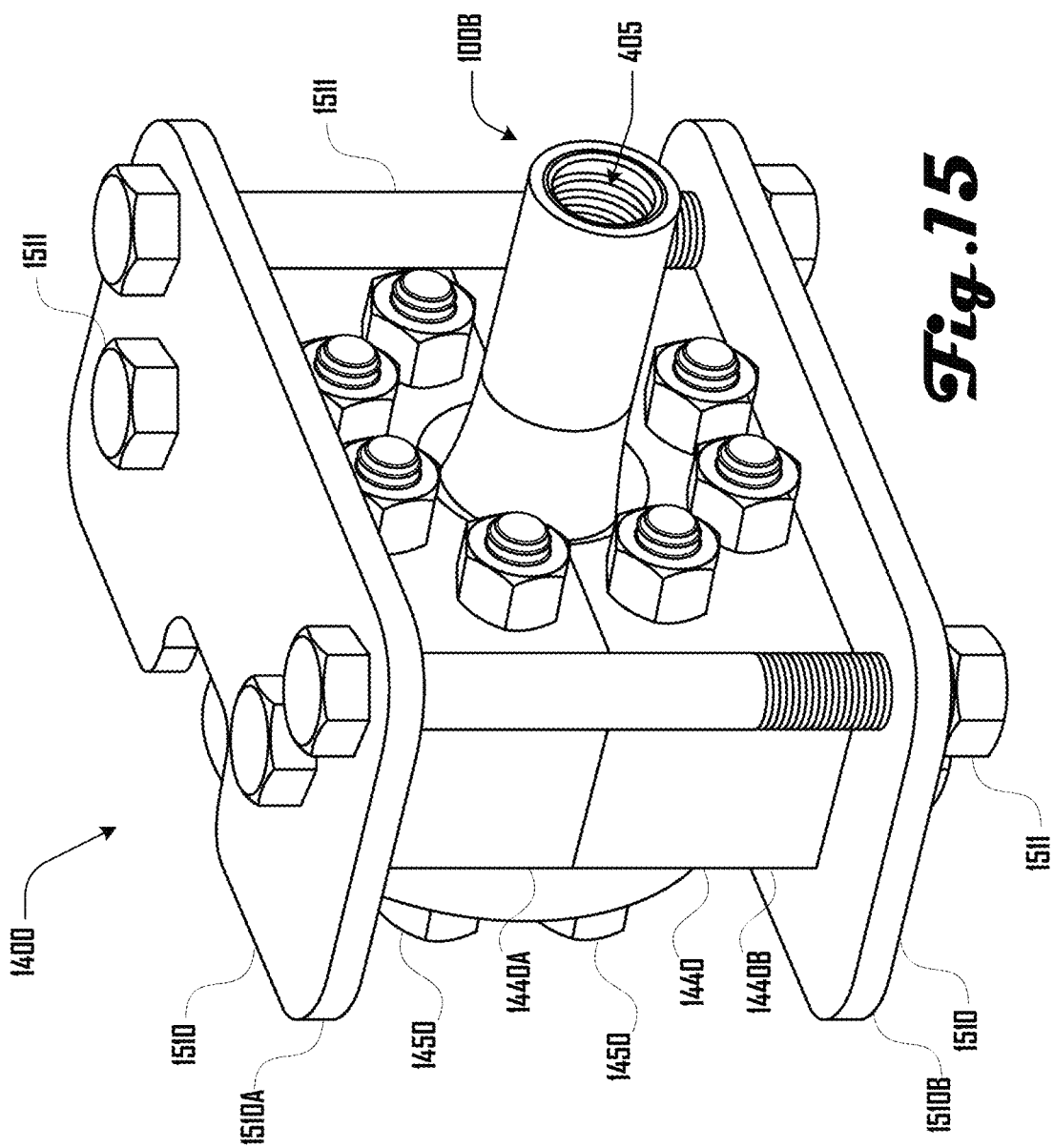

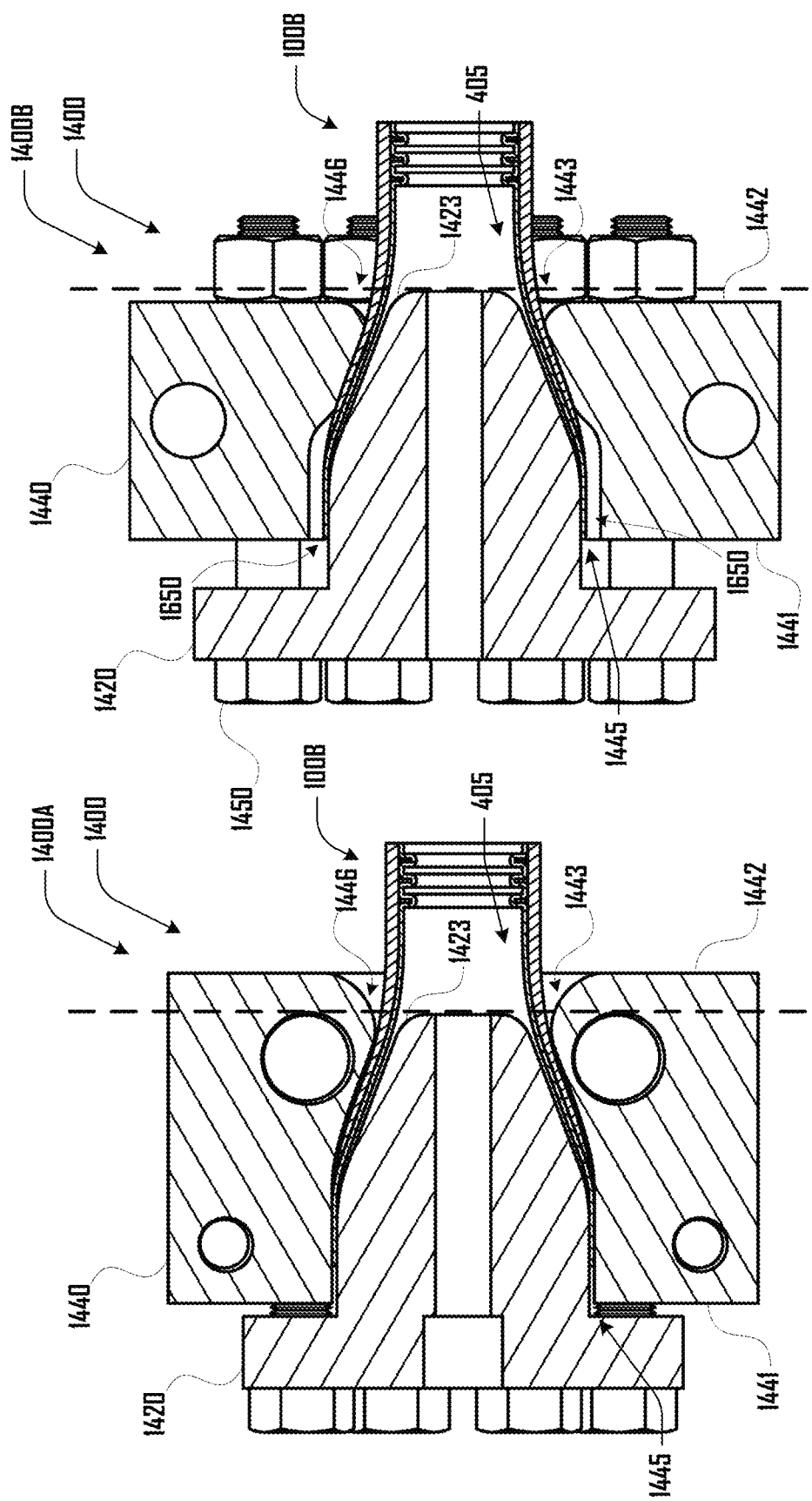

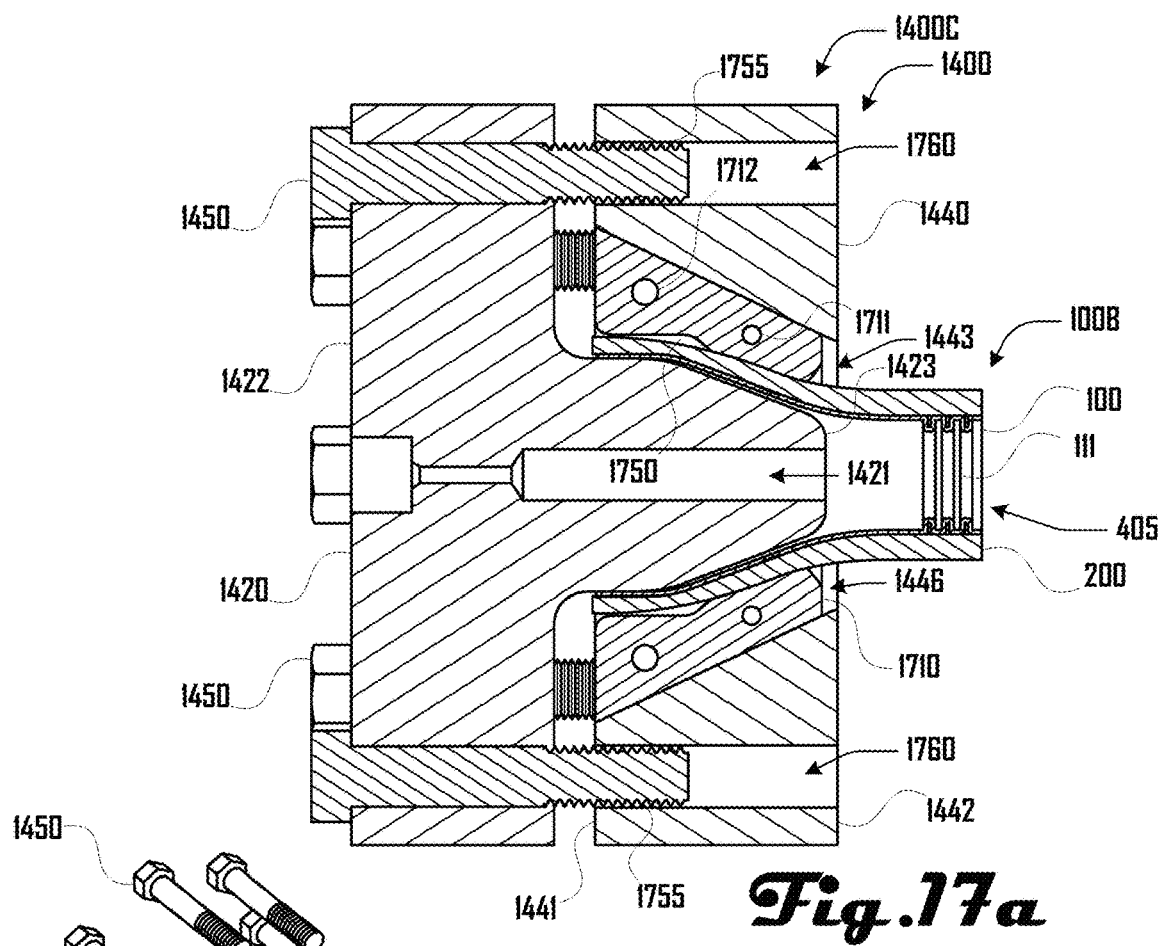
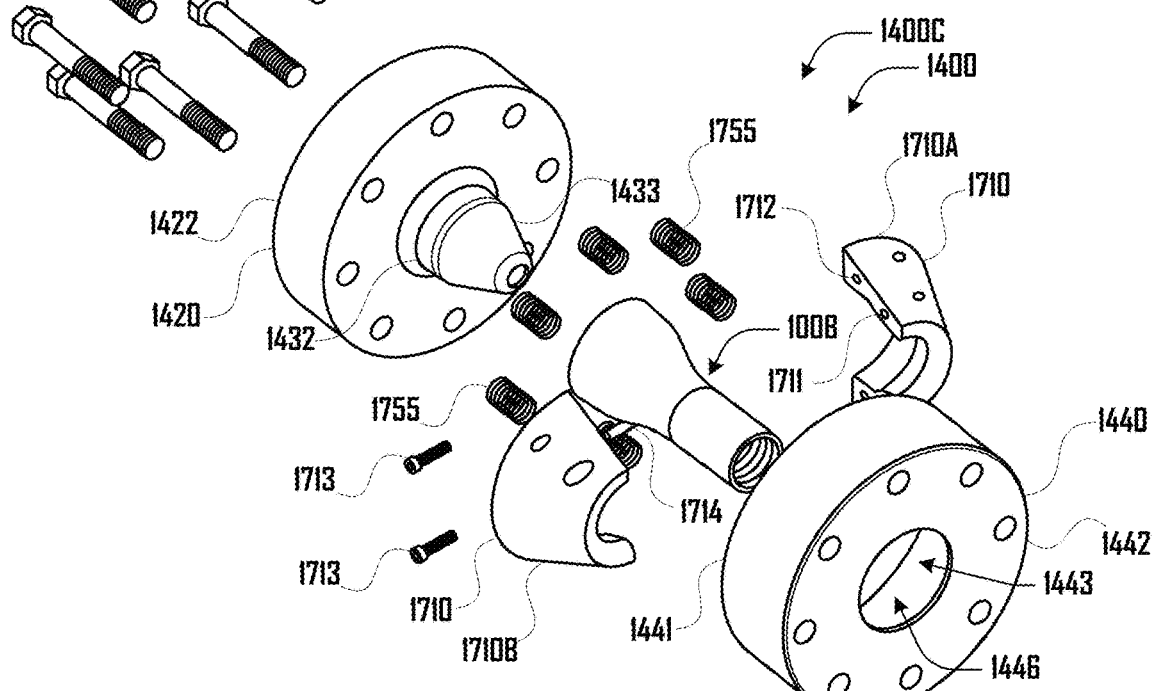

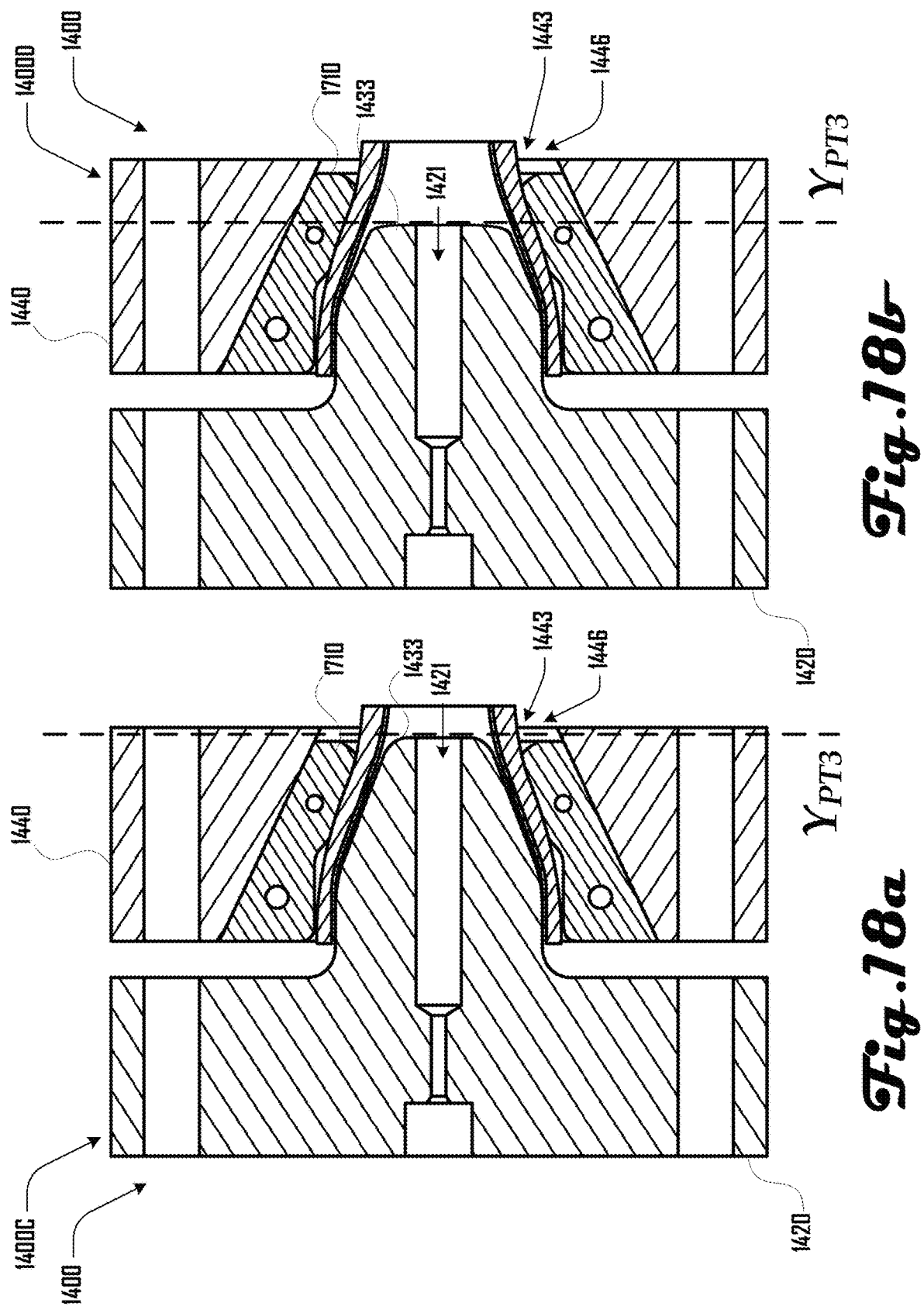

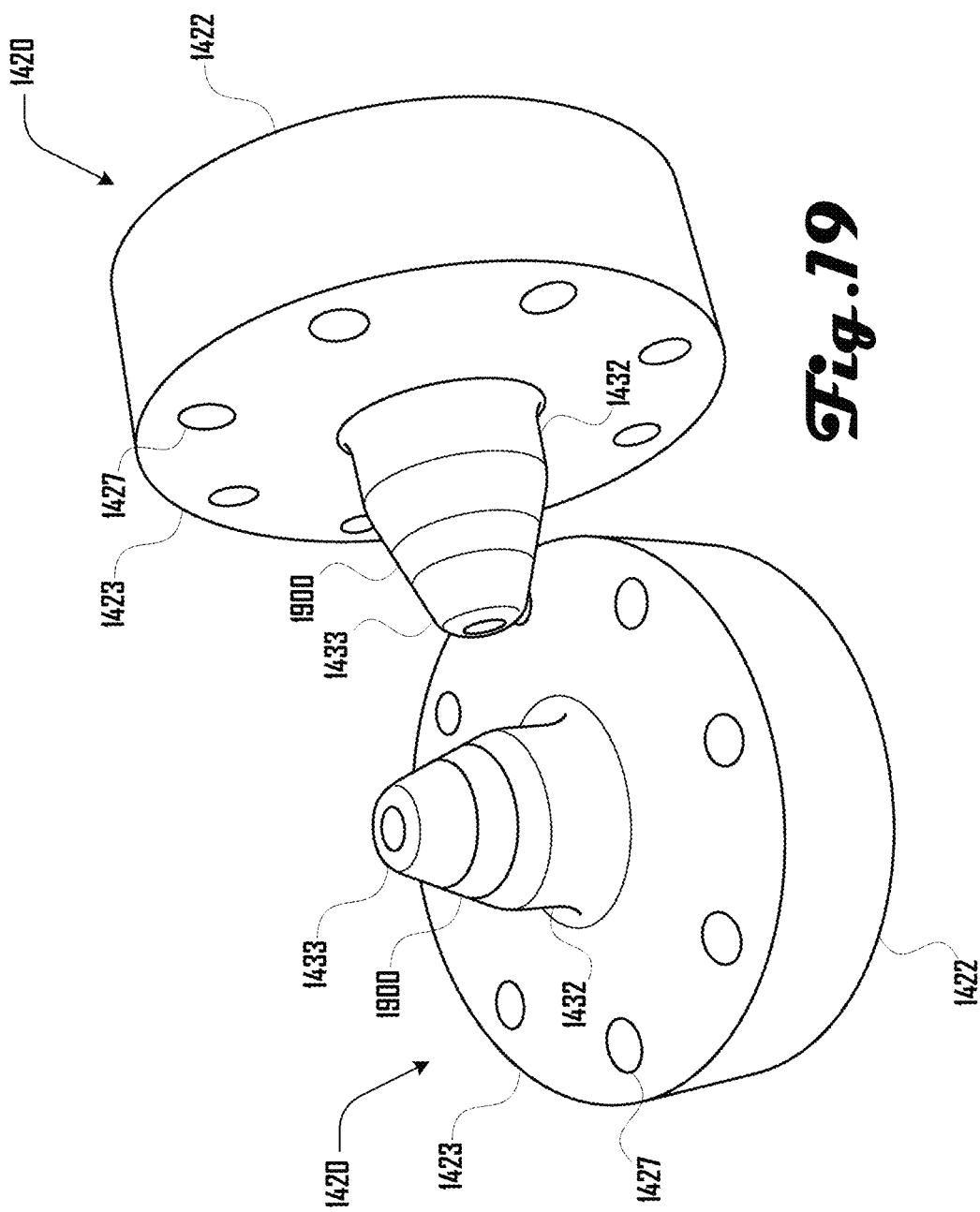

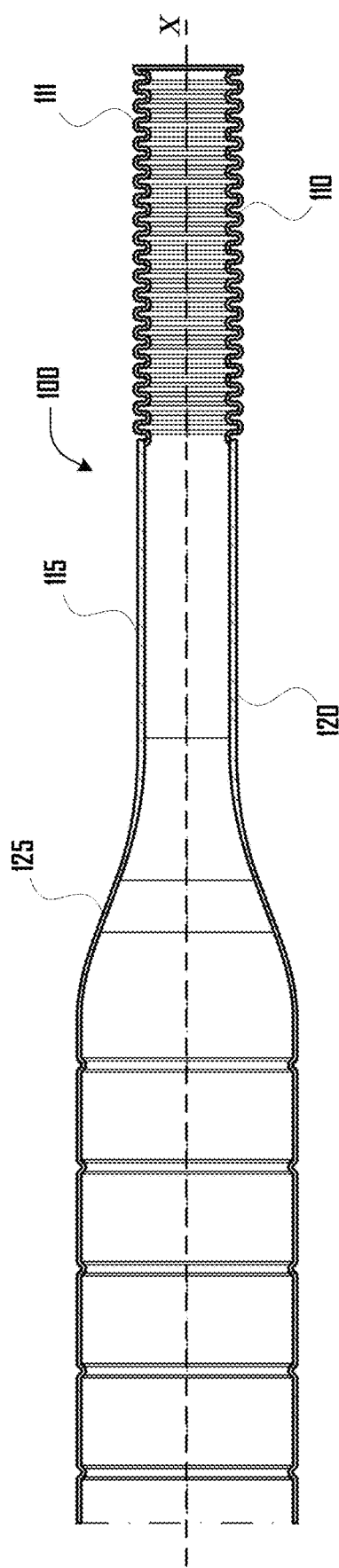

FITTINGS FOR COMPRESSED GAS STORAGE VESSELS

CROSS-REFERENCE TO RELATED APPLICATIONS

This application is a non-provisional of and claims priority to U.S. Provisional Patent Application No. 62/412,044 entitled FITTINGS FOR COMPRESSED GAS STORAGE VESSELS, filed Oct. 24, 2016, which is incorporated herein by reference in its entirety and for all purposes.

This application is related to U.S. Non-Provisional patent application Ser. No. 14/624,370 entitled COILED NATURAL GAS STORAGE SYSTEM AND METHOD, filed Feb. 17, 2015, which is incorporated herein by reference in its entirety and for all purposes.

This application is related to U.S. Non-Provisional patent application Ser. No. 14/172,831 entitled NATURAL GAS INTESTINE PACKED STORAGE TANK, filed Feb. 4, 2014, which is incorporated herein by reference in its entirety and for all purposes.

This application is related to U.S. Non-Provisional patent application Ser. No. 13/887,201 entitled CONFORMABLE NATURAL GAS STORAGE, filed May 3, 2013, which is incorporated herein by reference in its entirety and for all purposes.

This application is related to U.S. Provisional Patent Application No. 61/642,388 entitled CONFORMING ENERGY STORAGE, filed May 3, 2012, which is incorporated herein by reference in its entirety and for all purposes.

This application is related to U.S. Provisional Patent Application No. 61/766,394 entitled NATURAL GAS INTESTINE PACKED STORAGE TANK, filed Feb. 19, 2013 which is incorporated herein by reference in its entirety and for all purposes.

This application is related to U.S. Provisional Patent Application No. 62/175,914 entitled SYSTEM AND METHOD FOR A CONFORMABLE PRESSURE VESSEL, filed Jun. 15, 2015 which is incorporated herein by reference in its entirety and for all purposes.

This application is related to U.S. Provisional Patent Application No. 62/262,101 entitled SYSTEMS AND METHODS FOR LINER BRAIDING AND RESIN APPLICATION, filed Dec. 2, 2015 which is incorporated herein by reference in its entirety and for all purposes.

This application is related to U.S. patent application Ser. No. 15/368,182 entitled SYSTEMS AND METHODS FOR LINER BRAIDING AND RESIN APPLICATION, filed Dec. 2, 2016 which is incorporated herein by reference in its entirety and for all purposes.

BRIEF DESCRIPTION OF THE DRAWINGS

FIGS. 1a and 1b illustrate side views of a bare liner comprising a body having connector portions, taper portions and tubing portions.

FIG. 1c illustrates a close-up side view of corrugations of connector portions of a bare liner.

FIG. 1d illustrates a close-up side view of corrugations of tubing portions of a bare liner.

FIG. 4a illustrates a side view of fittings coupled to an end of a liner, with the fittings including a stem and ferrule.

FIG. 4b illustrates a cross-sectional view of fittings coupled to an end of a liner, with the fittings including a stem and ferrule.

FIGS. 6a and 6b illustrate a respective cross-section view and perspective view of a stem in accordance with a further embodiment.

FIGS. 7a and 7b illustrate a respective cross-section view and perspective view of a stem in accordance with one embodiment.

FIGS. 8a and 8b illustrate a respective cross-section view and perspective view of a stem in accordance with a further embodiment.

FIGS. 9a and 9b illustrate a respective cross-section view and perspective view of a stem in accordance with yet another embodiment.

FIGS. 10a and 10b illustrate a respective cross-section view and perspective view of a stem in accordance with a still further embodiment.

FIGS. 14a and 14b illustrate a cross sectional and exploded view of a fitting assembly that comprises a plug and a pair of shells.

FIG. 15 illustrates a perspective view of a fitting assembly coupled with a liner in accordance with one embodiment.

FIGS. 16a and 16b illustrate cross sectional views of a fitting assembly coupled with a liner in accordance with a first and second embodiment.

FIGS. 17a and 17b illustrate a cross sectional and exploded view of a fitting assembly coupled with a liner in accordance with another embodiment.

FIGS. 18a and 18b illustrate cross sectional views of a fitting assembly coupled with a liner in accordance with two further embodiments.

FIG. 19 illustrates one embodiment of a plug having an O-ring disposed on the plug tip of the plug.

FIG. 20 illustrates a side view of a bare liner comprising a body having a connector portion with a cuff and corrugations, a taper portion and tubing portion.

Figure 2A:
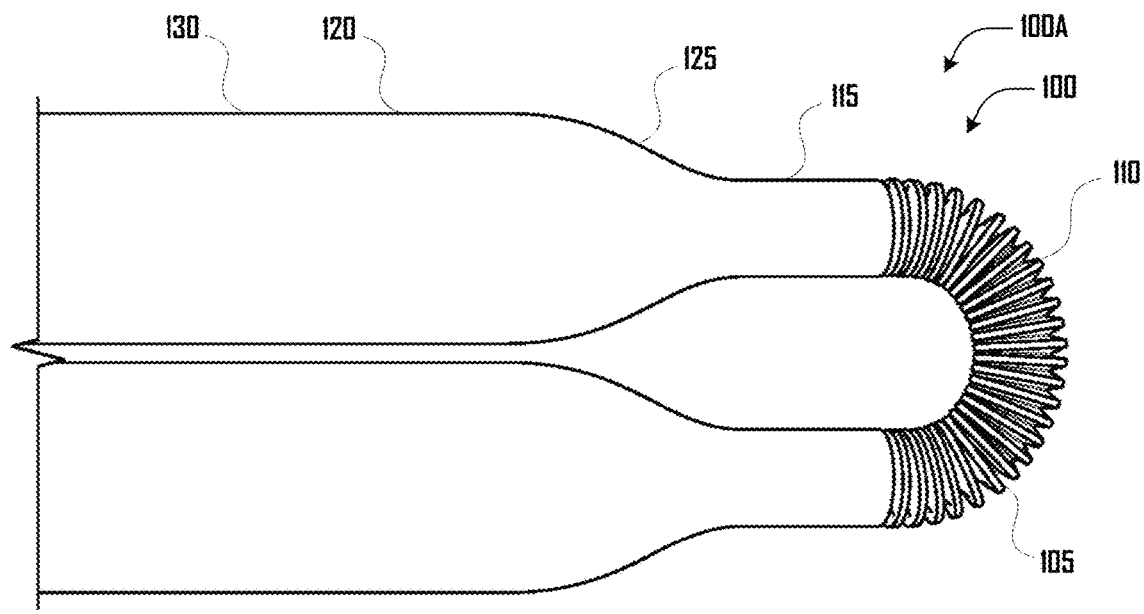
FIG. 2a illustrates a side view of a bare liner bending via corrugations of the connector portions.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 3A:
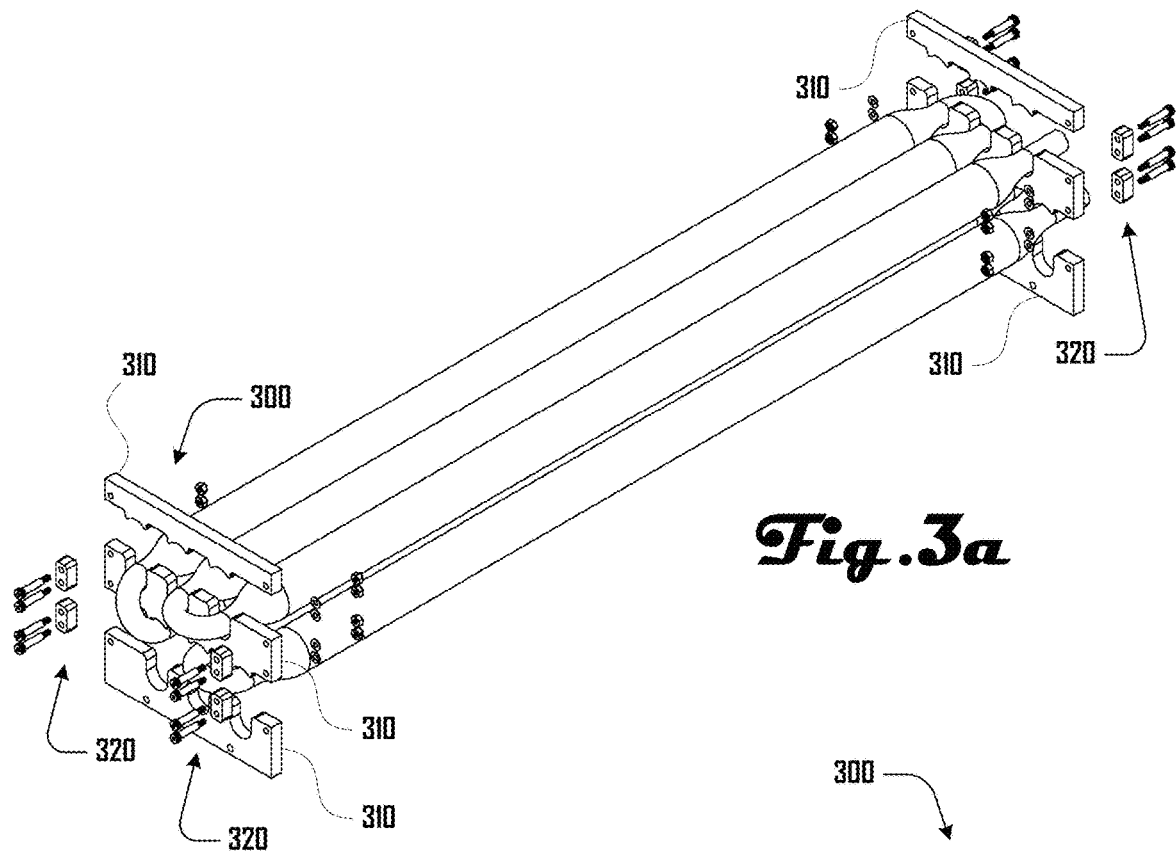
FIGS. 3a and 3b illustrate one embodiment where a liner is folded and held in a housing defined by a plurality of planks that are held together via bolt assemblies and engage with the folded liner.
Figure 3B:
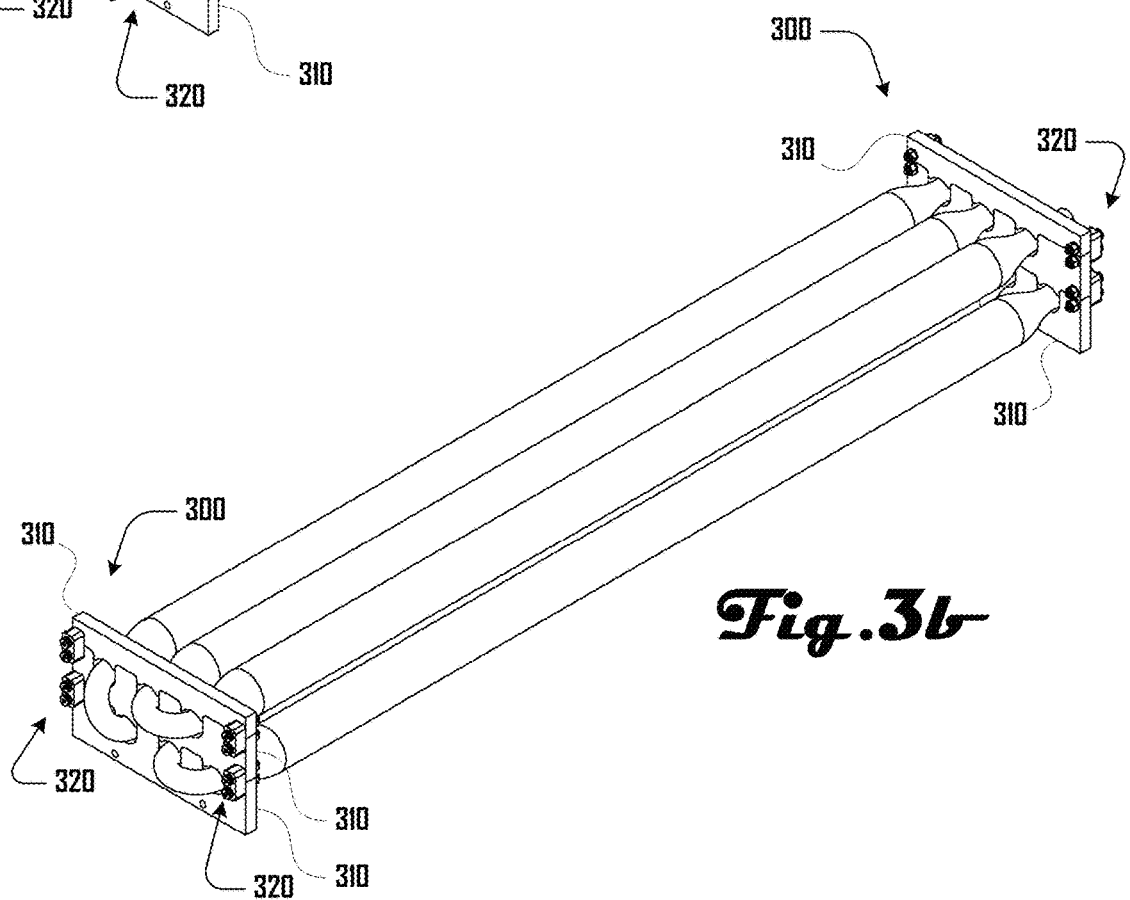
Figure 5A:
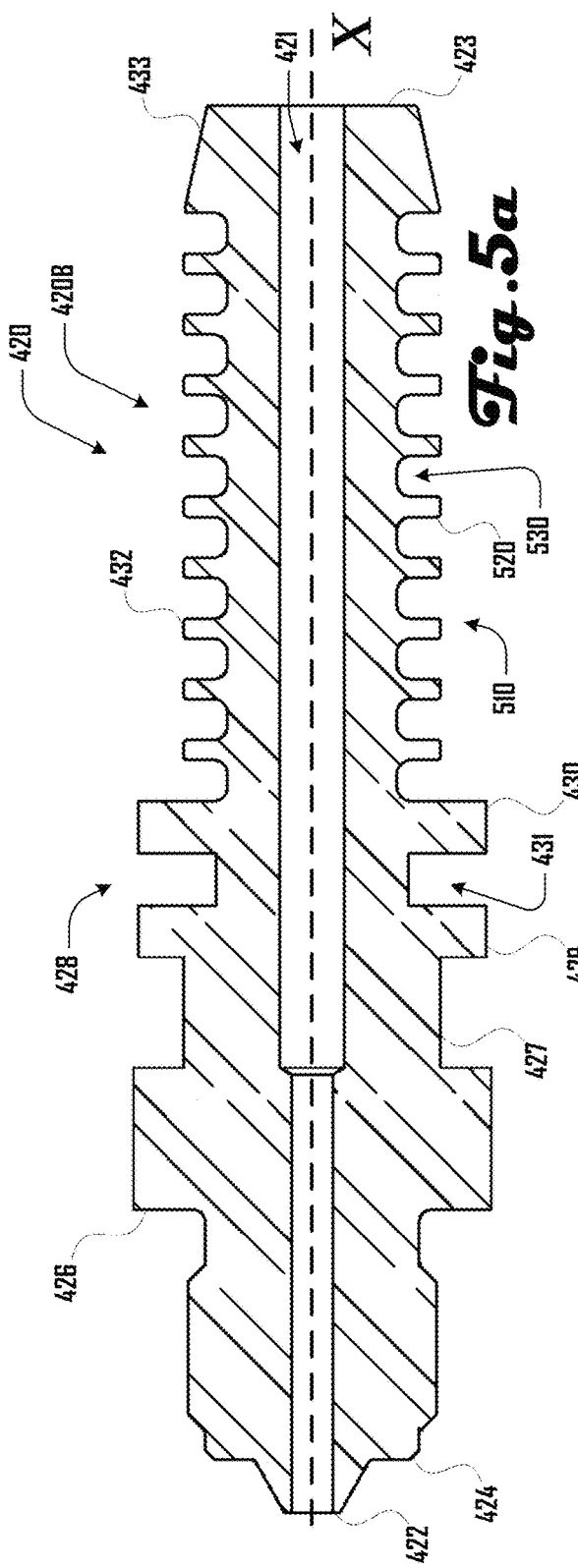
FIGS. 5a and 5b illustrate a respective cross-section view and perspective view of a stem in accordance with another embodiment.
Figure 5B:
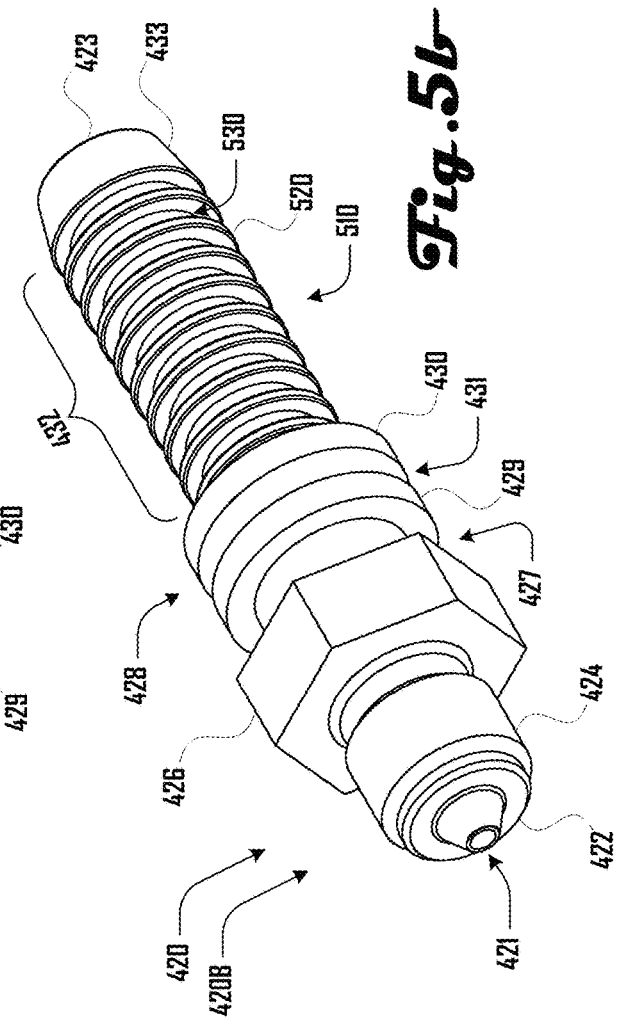

Turning to FIGS. 1a-d, a bare liner 100A is shown as comprising a body 105 having connector portions 110, taper portions 125 and tubing portions 130. The connector portion 110 can be corrugated, which can allow the connector portion 110 to be flexible such that the liner 100 can be folded into a housing 300 as illustrated in FIGS. 3a and 3b. Non-corrugated portions 120 can be rigid in various embodiments.

Figure 2B:
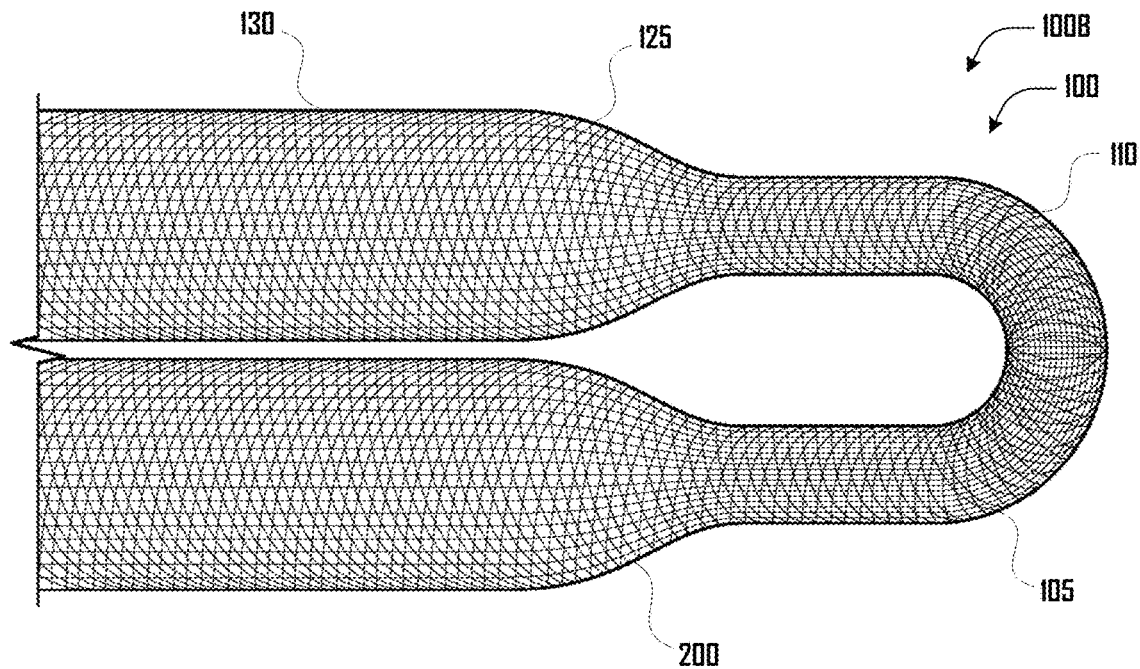
FIG. 2b illustrates a side view of the liner of FIG. 2a covered with braiding.

In various embodiments, the connector portion 110 can have a diameter that is smaller than the tubing portions 130, with the taper portion 125 providing a transition between the diameter of the connector portion 110 and the tubing portion 130. However, further embodiments can comprise a liner 100 with portions having one or more suitable diameter, and in further embodiments, a liner 100 can have portions that are non-cylindrical, which can include various suitable shapes. The connector portion 110 can comprise connector corrugations 111, which can allow the connector portion 110 to be flexible (e.g., as illustrated in FIGS. 2a and 2b) such that the liner 100 can be folded into a housing 300 as illustrated in FIGS. 3a and 3b.

Additionally, as illustrated in FIGS. 1a, 1b, 2a and 20 the connector portion 110 can comprise a cuff portion 115 defined by a non-corrugated portion 120 or rigid portion of the connector portion 110 between the corrugations 111 of the connector portion 110 and the taper portion 125. In further embodiments, the cuff portion 115 can be various sizes as illustrated in FIGS. 1a, 1b, 2a and 20. More specifically, FIGS. 1a and 1b illustrate a cuff portion 115 being smaller compared to the cuff portion 115 illustrated in FIGS. 2a and 20. In some embodiments, the cuff portion 115 can have a length that is less than, equal to, or greater than the length of the taper portion 125. In some embodiments, the taper portion 125 can have a length that is less than, equal to, or greater than the length of the cuff portion 115 or twice the length of the cuff portion 115.

Similarly, in some embodiments, the tubing portions 130 can comprise corrugations 131. However, in further embodiments, the corrugations 131 can be absent from the tubing portions (e.g., as illustrated in FIG. 2a). Non-corrugated portions 120 can be rigid in various embodiments.

In one embodiment, the liner 100 can be generated via extrusion molding systems, or the like, which can comprise rotating dies that are configured to rotate in concert such that corresponding dies mate about an extruded tube generated by an extruder. Corresponding mated dies can thereby define one or more of the connector portion 110, taper portion 125 and/or the tubing portion 130.

In various embodiments, a vacuum can pull the material of an extruded tube to conform to negative contours defined by the mated die. In some embodiments, positive pressure can be introduced within the tube to conform to negative contours defined by the mated die. In various embodiments, such a manufacturing process can be beneficial because liners 100 can be made seamlessly, with no welds, and using a single material.

In some embodiments, liners 100 having varying lengths of the connector portion 110, taper portion 125 and/or the tubing portion 130, can be made by selectively choosing the order of dies such that desired portions are made longer or shorter. For example, in some embodiments, a liner 100 can be produced that fits into an irregular or non-rectangular cavity, which can require a liner 100 to have tubing portions 130 of variable lengths.

In some embodiments, a liner 100 can be made by forming various pieces of the liner 100 and then coupling the pieces together. For example, connector portion 110 can be manufactured separately from the taper portion 125 and/or the tubing portion 130, and/or the cuff portion 115. Such separate portions can be subsequently coupled together to form the liner 100.

A liner 100 can comprise various suitable materials including plastic, metal, or like. In some preferred embodiments, a liner 100 can comprise Ultramid PA6, Rilsamid PA12, Lupolen HDPE, or the like.

Accordingly, the embodiments of a liner 100 shown and described herein should not be construed to be limiting on the wide variety of liners 100 that are within the scope and spirit of the present invention. For example, liners 100 as described U.S. Provisional Patent Application No. 62/175, 914, which is incorporated herein by reference, illustrates some further example embodiments of liners 100.

In some embodiments, a liner 100 can be a naked liner 100A as illustrated in FIGS. 1a-d, and 2a. However, as illustrated in FIG. 2b, in some embodiments a liner 100 can be a covered or over-braided liner 100B, which can include a braiding 200, or other suitable covering. An over-braided liner 110B can be desirable because the braiding 200 can increase the strength of the liner and thereby increase the duty pressure under which the liner 100 may safely operate. Additionally, braiding 200 can be disposed in a plurality of layers in various embodiments. For example, in one preferred embodiment, the braid 200 can comprise six layers of 48 carrier carbon braid 200.

As discussed in detail herein, the material(s), shape, size, configuration and other variables related to a braid 200 can be chosen to increase the strength provided by the braiding 200, increase the flexibility of the braiding 200, increase the strength to weight ratio of the braiding and the like. In various preferred embodiments, braiding 200 can be configured to completely cover a liner 100. In other words, one or more layers of braiding 200 can be configured to cover the liner 100 such that the liner is not visible through the braid 200 once applied to the liner 100 and such that gaps between the braid are not present such that the liner 100 is visible through the braid 200.

In various embodiments, the liner 100 can be folded into a three-dimensional structure. For example, FIGS. 3a and 3b illustrate one embodiment where a liner 100 is folded and held in a housing 300 defined by a plurality of planks 310 that are held together via bolt assemblies 320 and engage with the folded liner 100. In other words, in various embodiments, the liner 100 can be folded to define a folded tank body having a first and second tank body end as shown in the example of FIGS. 3a and 3b.

For example, slots defined by the planks 310 can engage and/or support portions of the liner 100, which can be desirable for preventing or limiting excessive movement of the liner 100, which may be undesirable because such movement may result in damage or weakening of the liner 100. For example, in embodiments where the housing 300 and liner 100 is disposed in or on a vehicle, elements such as the planks 310 can be configured to prevent or limit excessive movement of the liner 100, which may otherwise be caused by operation of the vehicle, tank filling and/or tank emptying. Additionally, in further embodiments, the housing 300 can comprise spacers between portions of the liner 100, which can further prevent such portions from damaging each other. For example, some embodiments can comprise elastomeric spacers between tubing portions 130, which can prevent or limit excessive movement of the liner 100, which may otherwise be caused by operation of the vehicle, tank filling and/or tank emptying.

As discussed herein, in some embodiments, a liner 100 can be a naked liner 100A (e.g., as shown in FIG. 2a) or can be an over-braided liner 100B (e.g., as shown in FIG. 2b). Accordingly, while various examples discussed below related to an over-braided liner 100B, it should be clear that further embodiments can apply to a naked liner 100A. Additionally, in some embodiments, the liner 100 and/or a braid 200 can be treated with a resin or the like.

Turning to FIGS. 4a and 4b, fittings 400 can be configured to couple with ends of a liner 100. In some embodiments, fittings 400 can be configured to couple with an over-braided liner 100B that includes a liner 100, which is surrounded by one or more layer of braiding 200 as illustrated in FIGS. 4a and 4b. For example, fittings 400 can comprise a stem 420 and a ferrule 440, which are configured to couple with an end 406 of a liner 100 that is surrounded by one or more layer of braiding 200 as described in detail herein.

Fittings 400 can be made of various suitable materials including metal, plastic, or the like. In some embodiments, fittings 400 can be configured to be in contact with compressed hydrogen and can be configured to be resistant to hydrogen embrittlement or weakening of the fittings 400 and fracturing resulting from hydrogen diffusion into the fittings 400. For example, the fittings 400 can comprise a material and/or surface coating that is resistant to hydrogen induced fracturing.

The stem 420 can define a bore 421 that extends through the stem 420 along an axis X between a first and second end 422, 423. As illustrated in the example of FIG. 4b, the bore 421 can comprise a narrower diameter proximate to the first end 422 and a larger diameter proximate to the second end 423. Further embodiments can comprise of any suitable size(s) and/or shape(s) of bore 421. For example, in some embodiments having a larger diameter bore 421 can be desirable to increase the flow rate through the bore 421, which can be desirable for faster filling.

The stem 420 can comprise a head 424 that includes threads 425, which can be configured to couple with various systems such that suitable fluids can be introduced to and/or removed from an interior cavity 405 defined by the liner 100. For example, where such a fluid comprises hydrogen, the head 424 can be directly or indirectly coupled with a hydrogen filling station to fill the interior cavity 405 defined by the liner 100 with hydrogen and can be directly or indirectly coupled with a vehicle engine to provide hydrogen fuel to the vehicle engine from hydrogen stored within the interior cavity 405 defined by the liner 100.

The head 424 can also connect to various other suitable components including a valve, pressure regulator, thermally activated pressure relief device, temperature sensor, pressure sensor, or the like. While various example embodiments discussed herein relate to a male conical shape of a head 424 that can be configured to seal against a corresponding female cone, further coupling or mating structures of various configurations can be implemented in further embodiments. For example, in one embodiment, the head 424 can comprise an O-ring face seal, an O-ring bore seal, or the like.

Additionally, various components can be configured to extend into a fitting 400 or into the cavity 406 defined by the over-braided liner 100B. For example such components can include at least a portion of a gas injector, a gas receiver (e.g., including a filter and an excess flow valve), a temperature sensor, a pressure sensor, a bleed valve, a temperature pressure relief device (TPRD), and the like. In some embodiments such components can be interested into and reside within the bore 421 of the stem 420. In various embodiments, it can be desirable to have a large diameter bore 421 to accommodate such components.

Figure 22:
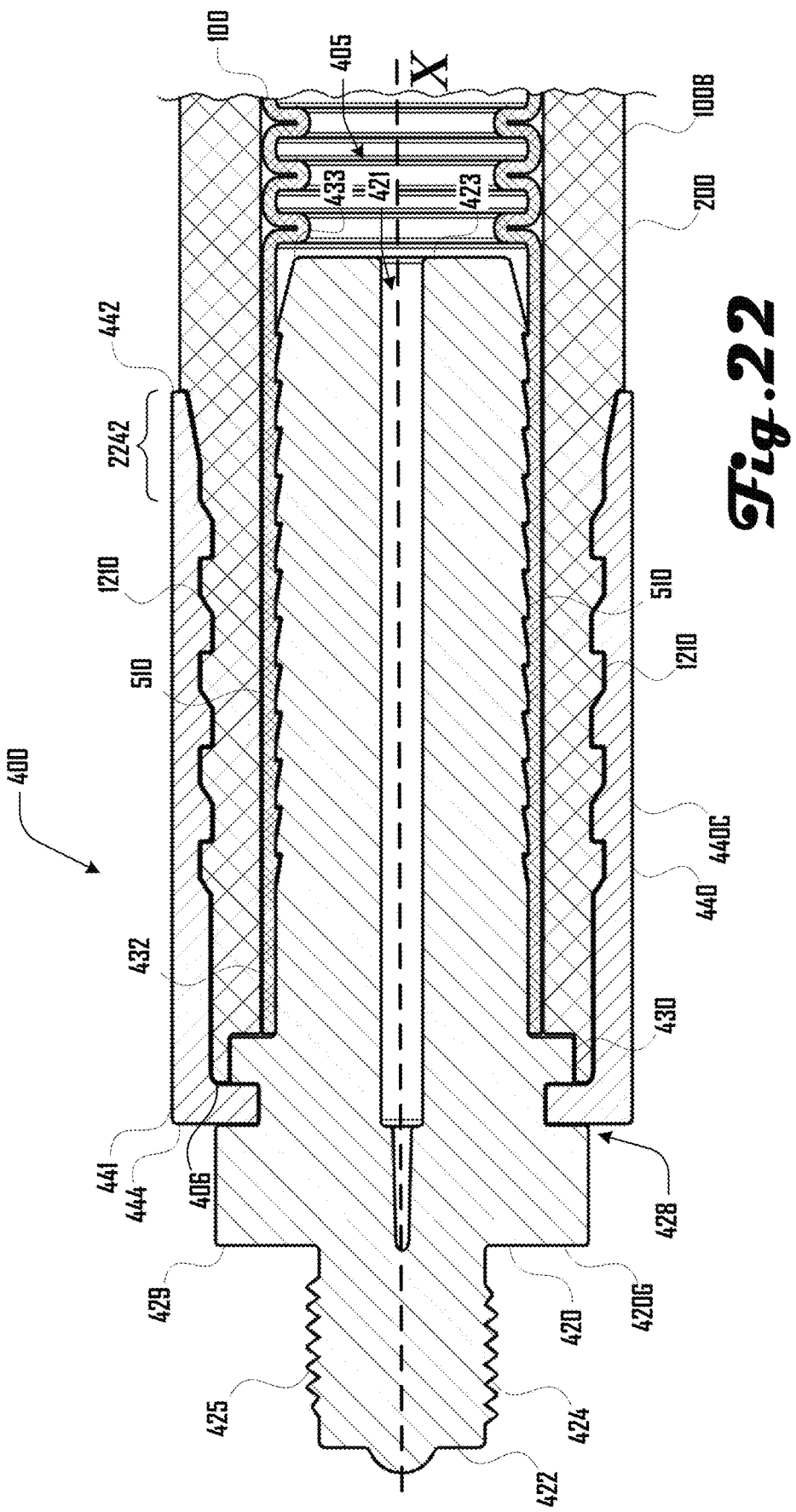
FIG. 22 illustrates a side view of fittings of another embodiment coupled to an end of a liner, with the fittings including a stem and ferrule.
Figure 23:
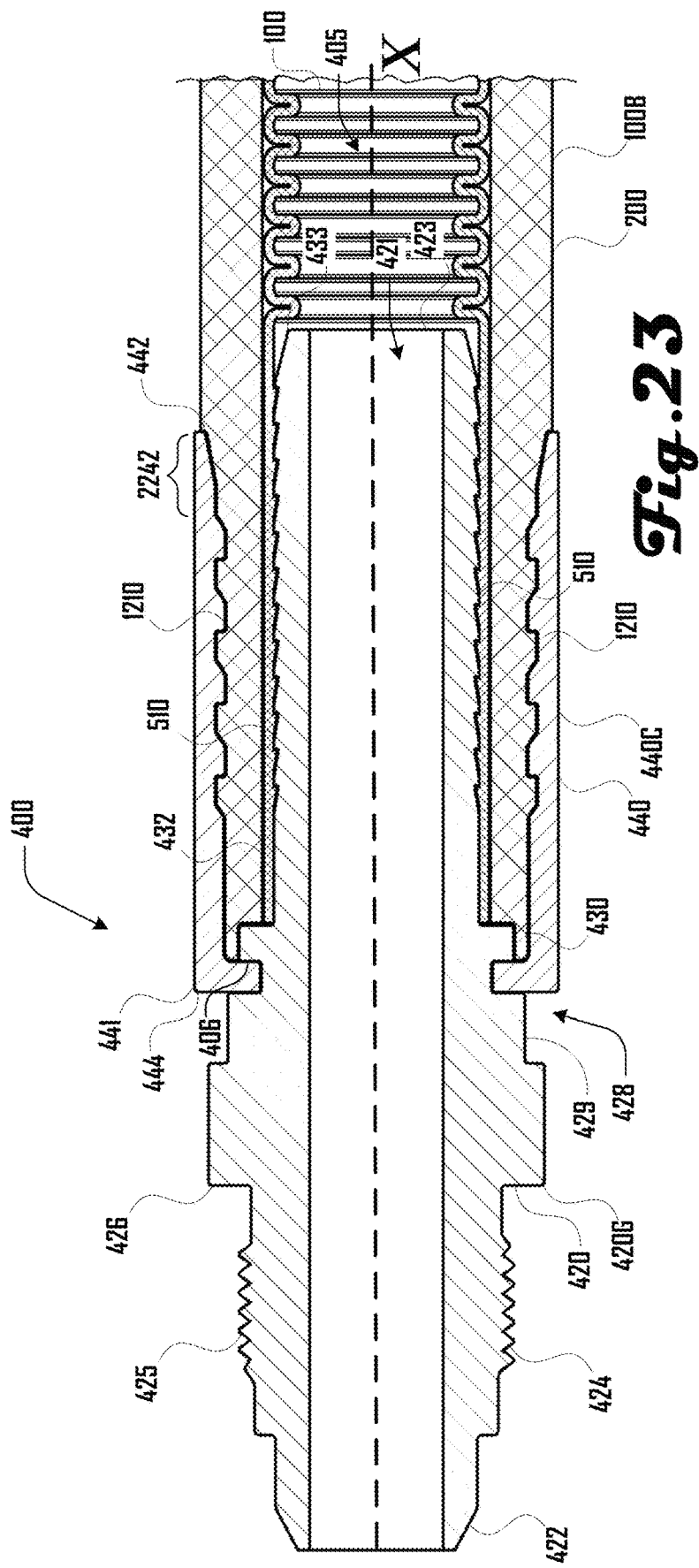
FIG. 23 illustrates a side view of fittings of a further embodiment coupled to an end of a liner, with the fittings including a stem and ferrule.
Figure 24:
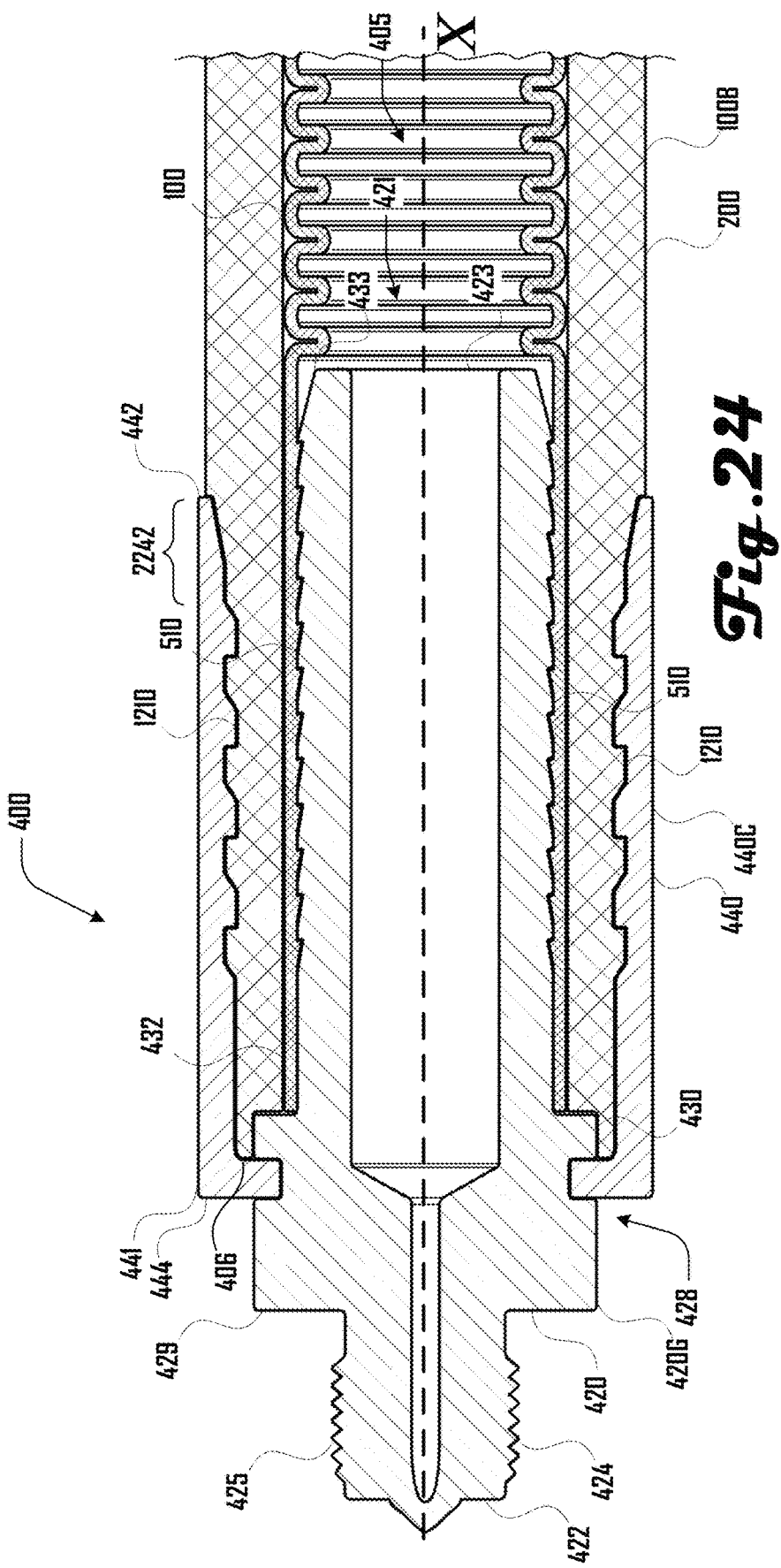
FIG. 24 illustrates a side view of fittings of yet another embodiment coupled to an end of a liner, with the fittings including a stem and ferrule.

The head 424 can extend to a nut 426, which can have a larger diameter than the head 424 in various embodiments. However, in some embodiments (e.g., as shown in FIGS. 22 and 24), the nut 426 can be absent. The nut 426 can extend to a neck 427, which can have a smaller diameter than the nut 426. However, in some embodiments, (e.g., as shown in FIG. 23), the neck 427 can be absent. The neck 427 can extend to a coupling architecture 428 defined by a first and second rim 429, 430 disposed on opposite sides of and defining a coupling groove 431. A coupling body 432 can extend from the coupling architecture 428 and terminate at tip 433 disposed at the second end 423 of the stem 420.

The ferrule 440 can comprise a cylindrical body having a first and second end 441, 442 with a lip 444 defining a coupling orifice 445 at the first end 441. The ferrule 440 can further define a cavity 443 that extends between the first and second end 441, 442 and opens to the coupling orifice 445 at the first end 441 and an opening 446 at the second end 442. Such structures of a ferrule 440 are illustrated in further figures and discussed in further detail herein.

In various embodiments, the stem 420 and ferrule 440 can couple about an end 406 of an over-braided liner 100B in various suitable ways such that a fluid-tight seal is generated by the resulting fitting 400. Such a coupling can be configured or rated for use with pressurized fluids including being rated for use at 10 MPa, 25 MPa, 50 MPa, 70 MPa, 90 MPa, 110 MPa, 130 MPa, 150 MPa, or the like. In one preferred embodiment, a fitting 400 comprising a stem 420 and ferrule 440 as described herein can be rated for use with pressurized hydrogen at 70 MPa nominal working pressure. In another preferred embodiment, a fitting 400 comprising a stem 420 and ferrule 440 as described herein can be rated for use with compressed natural gas (CNG) at 25 MPa nominal working pressure. Although various embodiments discussed herein can be configured for use with fuel fluids such as hydrogen or CNG, further embodiments can be configured for use with any suitable fluid at various suitable pressures. Additionally, some embodiments can be configured for use with cryogenic fluids, room-temperature fluids, or heated fluids.

A stem 420 and ferrule 440 can be coupled to an over-braided liner 100B in various ways. For example, in one embodiment, the second end 423 of the stem 420 can be inserted into the liner cavity 405 at an end 406 of the over-braided liner 100B such that the tip 433 and coupling body 432 are disposed within the liner cavity 405. The ferrule 440 can slide over the stem 420 and over the end 406 of the over-braided liner 100B such that the end 406 of the over-braided liner 100B is disposed within the cavity 443 of the ferrule 440 with the stem 420 extending though the coupling orifice 445 of the ferrule 440. The lip 444 of the ferrule 440 can be positioned about the coupling groove 431 and the ferrule 440 can be crimped such that the lip 444 engages and couples with the coupling architecture 428, which can include the lip 444 engaging one or both of the first and second rim 429, 430 and extending into the coupling groove 431 as illustrated in FIG. 4b.

Figure 21:
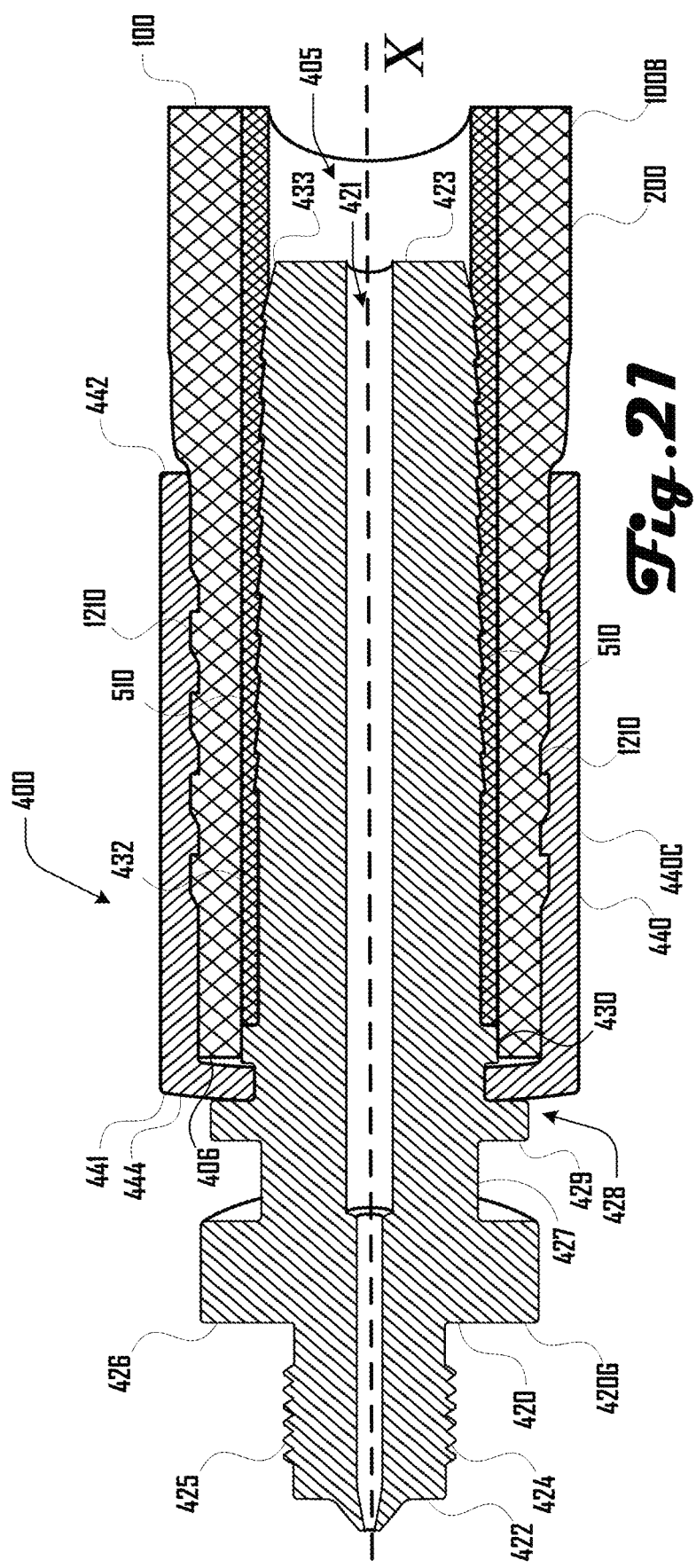
FIG. 21 illustrates a side view of fittings of one embodiment coupled to an end of a liner, with the fittings including a stem and ferrule.

Accordingly, the over-braided liner 100B can be sandwiched between the ferrule 440 and coupling body 432 of the stem 420 to generate a seal at the end 406 of the over-braided liner 100B. FIG. 4b illustrates an example embodiment where a space remains in the cavity 443 between the end 406 of the over-braided liner 100B and the lip 444 and coupling architecture 428. However, in further embodiments, the end 406 of the over-braided liner 100B can engage or extend proximate to the lip 444 and/or coupling architecture 428 (e.g., at the rim 430 as illustrated in FIG. 21).

FIGS. 4a and 4b illustrate one example embodiment of a stem 420A and ferrule 440A. However, such an example embodiment should not be construed to be limiting on the variety of shapes, sizes and alternative configurations of a stem 420 and/or ferrule 440 that are contemplated within the scope and spirit of the present disclosure. For example, FIGS. 5a, 5b, 6a, 6b, 7a, 7b, 8a, 8b, 9a, 9b, 10a and 10b illustrate respective example embodiments 420B, 420C, 420D, 420E, 420F, 420G of a stem 420. Additionally, FIGS. 11a, 11b, 12a, 12b, 13a and 13b illustrate respective example embodiments 440B, 440C, 440D of a ferrule 440.

In various embodiments, the coupling body 432 of the stem 420 can be defined by a flat surface (e.g., a flat surface about a diameter of the coupling body 432). For example, FIGS. 4b, 6a, 6b, 7a, 7b, 8a, 8b, 9a and 9b illustrate a stem 420 comprising a flat surface 610 about a diameter of the coupling body 432.

In further embodiments, the coupling body 432 of the stem 420 can be defined by a non-flat surface (e.g., a non-flat surface about a diameter of the coupling body 432). For example FIGS. 5a, 5b and 21-24 illustrate a stem 420 comprising a coupling body 432 that defines a ribbed profile 510 along a length of the coupling body 432. More specifically, the ribbed profile 510 is shown as being defined by a plurality of spaced apart ribs 520 that define a plurality of valleys 530. In this example, the ribs 520 and valleys 530 are shown having respectively consistent height with the ribs 520 extending perpendicularly and radially from the stem 420 at regular intervals to define valleys 530 having a consistent size. However, in further embodiments, such ribs 520 and valleys 530 can be configured in various suitable ways and can have varying sizes and/or shapes, which can be varied in a pattern, randomly, symmetrically, with a variance extending from a first end to a second end of the coupling body 432 and the like.

FIGS. 10a and 10b illustrate another example of a non-flat surface about a diameter of the coupling body 432; namely, a toothed profile 1010 that can be defined by a plurality of respective slopes 1020 and edges 1030. In this example, the slopes 1020 and edges 1030 are alternatively repeated to generate a consistent toothed profile 1010 extending along a length of the coupling body 432. However, in further embodiments, the slopes 1020 and edges 1030 can be configured in various suitable ways and can have varying sizes and/or shapes, which can be varied in a pattern, randomly, symmetrically, with a variance extending from a first end to a second end of the coupling body 432 and the like. Additionally, while the example of FIGS. 10a and 10b illustrates an embodiment 420G where the edges 1030 extend perpendicularly and radially from the stem 420, with the edges facing the first end 422 of the stem 420, further embodiments can be configured in other suitable ways, including the edges facing the second end 423 of the stem 420 or being disposed at a non-perpendicular angle from axis X.

Additionally, in various embodiments, the coupling body 432 can comprise a flat surface 610 about a diameter of the coupling body 432 along a first length and a non-flat surface about a diameter of the coupling body 432 along a second length. For example, as illustrated in FIGS. 10a and 10b, a flat profile 610 can define a first length of the coupling body 432 proximate to the coupling architecture 428 and define a toothed profile 1010 along a second length proximate to the second end 423 of the stem 420.

In various embodiments, the coupling body 432 can be configured to couple with an over-braided liner 100B and/or non-braided liner 100A. For example, in some embodiments, the coupling body 432 can be sized to correspond to a portion of a liner 100 including the connector portion 110, taper portion 125 or the tubing portion 130 of a liner (FIGS. 1a-d, 2a, 2b, 3a, 3b, 4a and 4b). Accordingly, various embodiments can comprise a coupling body 432 having a substantially consistent maximum size along the length of the coupling body 432, whereas other embodiments can change maximum size along the length of the coupling body 432. Additionally, the profile of the coupling body 432 can be configured to correspond to or match corrugations 111, 131 or other features of a liner 100. For example, in some embodiments, the coupling body 432 can be configured such that when a ferrule 440 is crimped over an over-braided liner 100B, features in the liner 100 (e.g., corrugations 111, 131) are forced into structures of the coupling body 432 (e.g., a toothed profile 1010 and/or valleys 530) instead of such features of the liner 100 being flattened or otherwise unsuitably deformed.

The coupling body 432 can also be configured to bite or engage a liner 100 in various suitable ways. For example, referring to FIGS. 5a, 5b and 21-24, a ribbed profile 510 defined by ribs 520 and valleys 530 can be desirable in various embodiments for generating a strong seal between the stem 420 and the liner 100. In some embodiments, the liner 100 can comprise a deformable material, which can be pressed into the valleys 530 between ribs 520 when a ferrule 440 is crimped over the liner 100 and stem 420. In other words, the process of crimping a ferrule 440 over the liner 100 can cause the liner 100 to be mashed into the valleys 530 such that the liner 100 is securely held and a strong seal is generated between the liner 100 and the stem 420. In addition to providing a strong seal, such an engagement can be desirable for preventing the end 406 of the liner 100 from being pulled from the fitting 400 in cases where such a pulling force is applied to the fitting 400.

In another example, a toothed profile 1010 as illustrated in FIGS. 10a and 10b can also be desirable for generating a strong seal between the stem 420 and liner 100 and/or can be desirable for preventing the end 406 of the liner 100 from being pulled from the fitting 400 in cases where such a pulling force is applied to the fitting 400. In other words, the process of crimping a ferrule 440 over the liner 100 can cause the liner 100 to be mashed into the toothed profile 1010 such that the liner 100 is securely held and a strong seal is generated between the liner 100 and the stem 420.

Additionally, in further embodiments, the coupling architecture 428 defined by the first and second rim 429, 430 can be configured in various suitable ways. For example, as illustrated in FIGS. 4a, 4b, 5a, 5b, 6a, 6b the first and second rim 429, 430 can be substantially the same height or have the same radius. However, in further embodiments, as illustrated in FIGS. 7a, 7b, 8a, 8b, 9a, 9b, 10a and 10b, the first and second rim 429, 430 can be a different height or have a different radius. For example, the second rim 430 can have a smaller height or smaller radius than the first rim 429 as illustrated in FIGS. 7a, 7b, 8a, 8b, 9a, 9b, 10a, 10b and 20.

In some embodiments, the second rim 430 can have a height or radius extending from a face of the coupling body 432 that corresponds to a width or radius of a portion of the over-braided liner 100B. For example, as illustrated in FIG. 21, the size of the second rim 430 can correspond to the width or thickness of the liner 100. Also, as illustrated in FIG. 21, at the end 406 of an over-braided liner 100B the liner 100 can be configured to extend to the second rim 430 and the braid 200 can be configured to extend over the top of the second rim 430 and to the lip 444 of the ferrule. In other words, the end 406 of an over-braided liner 100B can comprise a braid 200 that extends past the face of the end of the liner 100 with height(s), length(s) and/or width(s) of the liner 100 and/or braid 200 corresponding to height(s), length(s) and/or width(s) of various structures of the ferrule 440 and/or stem 420. Additionally, in some embodiments, the stem 420 can comprise a backstop and/or taper features in the coupling architecture 428 to guide the ferrule 440 into the coupling groove 431.

Turning to FIGS. 11a, 11b, 12a, 12b, 13a and 13b, three further example embodiments 440B, 440C, 440D of a ferrule 440 are illustrated. As discussed herein, a ferrule 440 can comprise a cylindrical body having a first and second end 441, 442 with a lip 444 defining a coupling orifice 445 at the first end 441. The ferrule 440 can further define a cavity 443 that extends between the first and second end 441 and opens to the coupling orifice 445 at the first end 441 and an opening 446 at the second end 442.

Figure 11A:
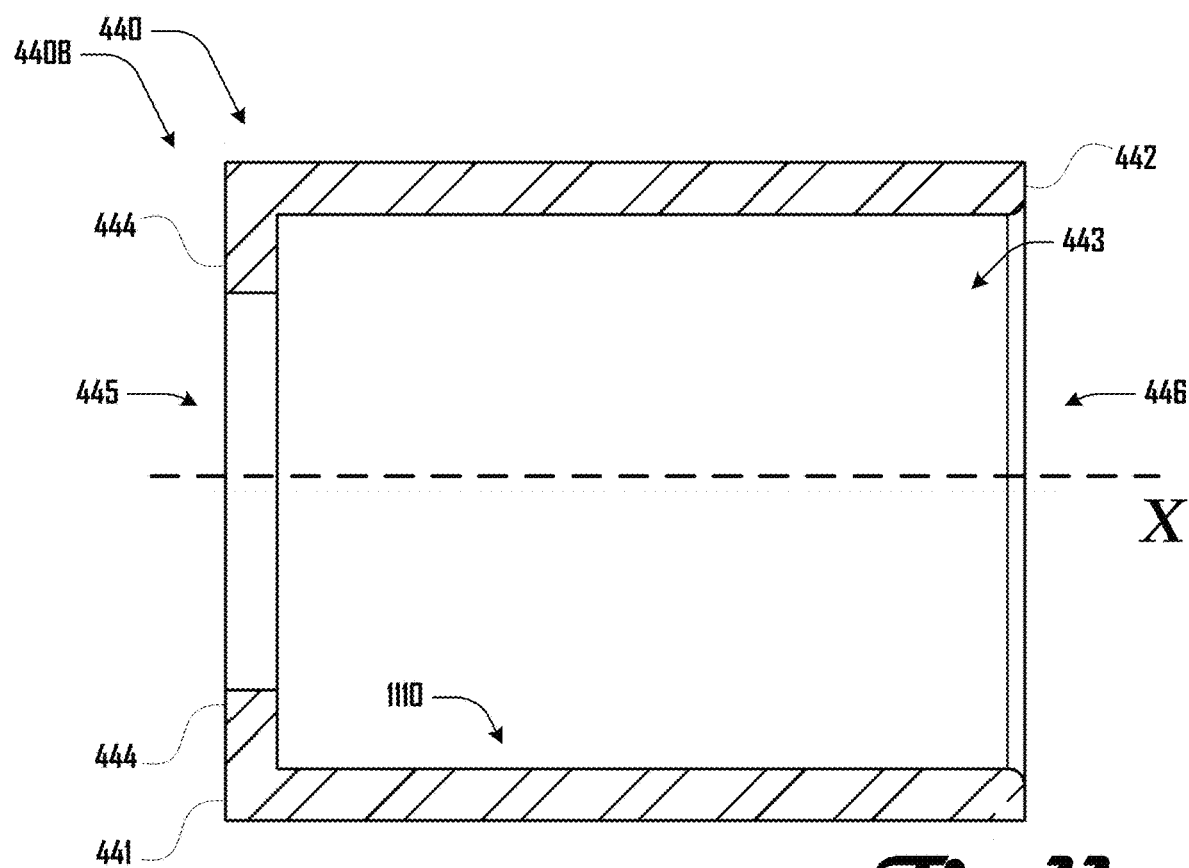
FIGS. 11a and 11b illustrate a respective cross-section view and perspective view of a ferrule in accordance with one embodiment.
Figure 11B:
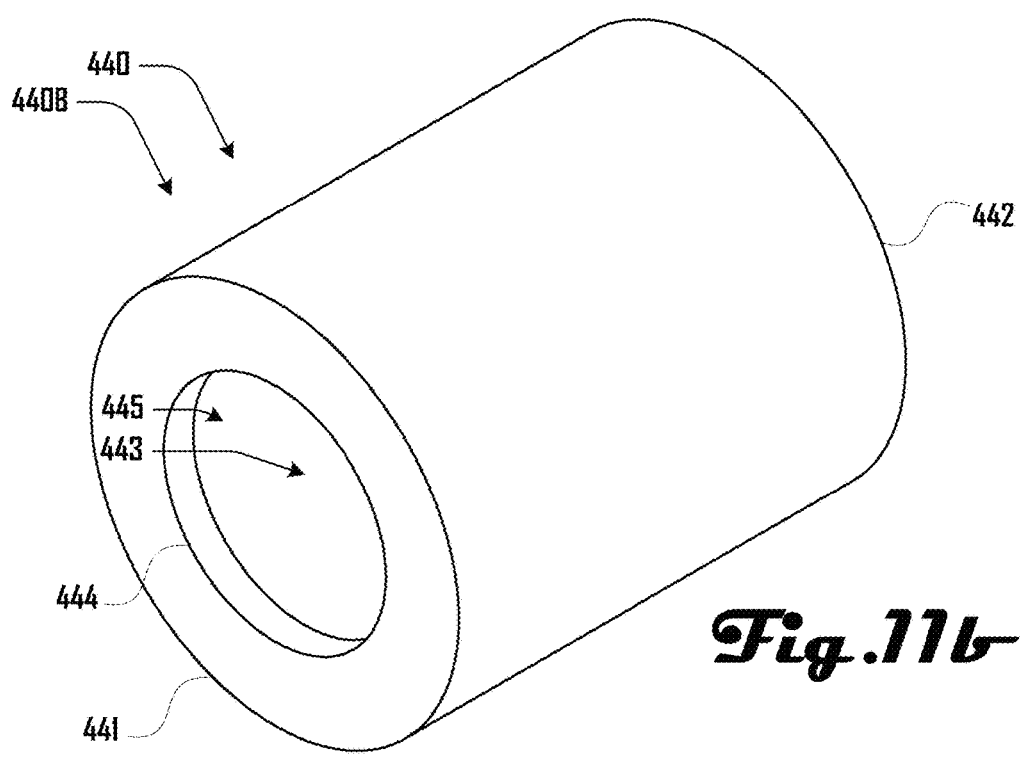

In some embodiments, an internal surface that defines the cavity 443 can have a smooth profile 1110 as illustrated in FIGS. 11a and 11b. However, in some embodiments, the internal surface that defines the cavity 443 can have a toothed profile 1210 as illustrated in FIGS. 12a, 12b, and 21-24.

In some embodiments, it can be desirable to have a ferrule 440 with a smooth inner surface profile 1110 within the cavity 443 because non-smooth features (e.g., teeth 1210, diamonds 1310, or the like) may undesirably bite into the braid 200 of an over-braided liner 100B, which may damage the braid 200.

Figure 12A:
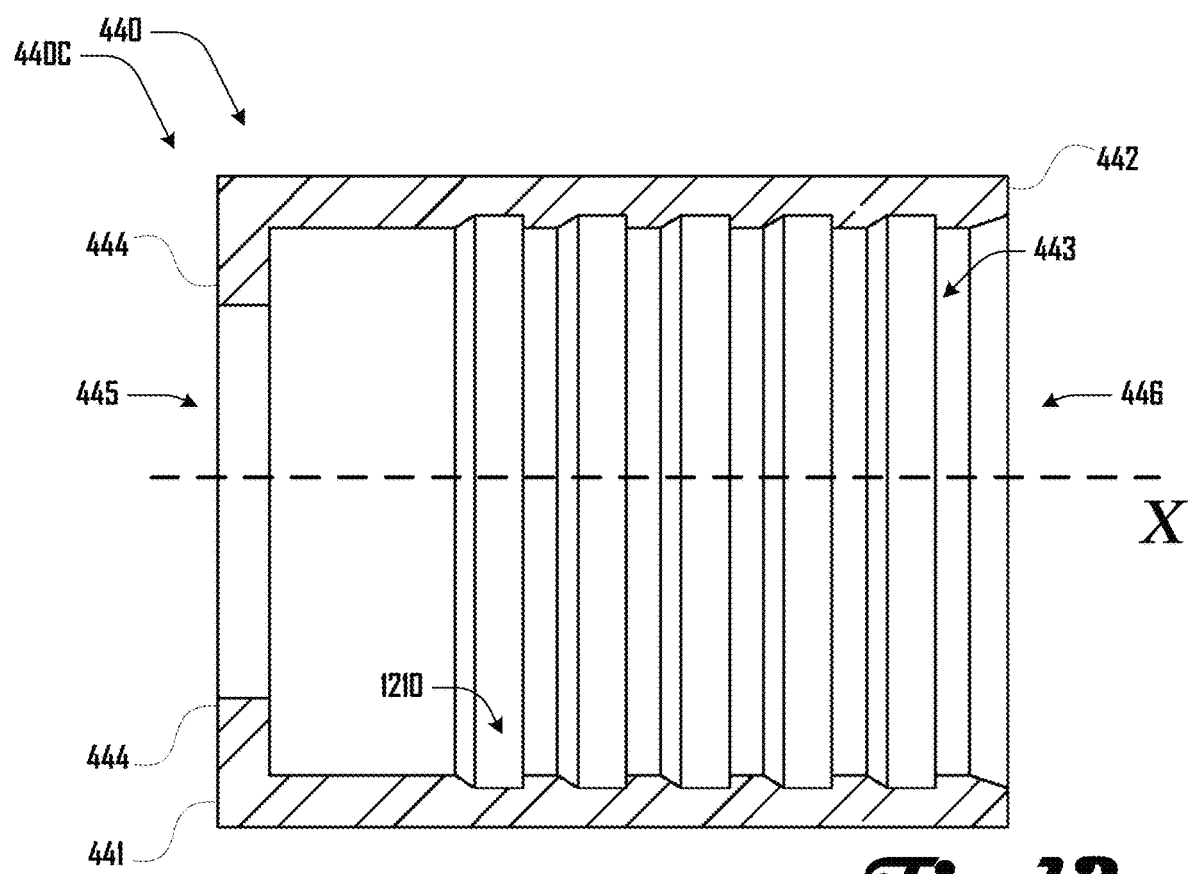
FIGS. 12a and 12b illustrate a respective cross-section view and perspective view of a ferrule in accordance with another embodiment having toothed profile within a cavity of the ferrule.
Figure 12B:
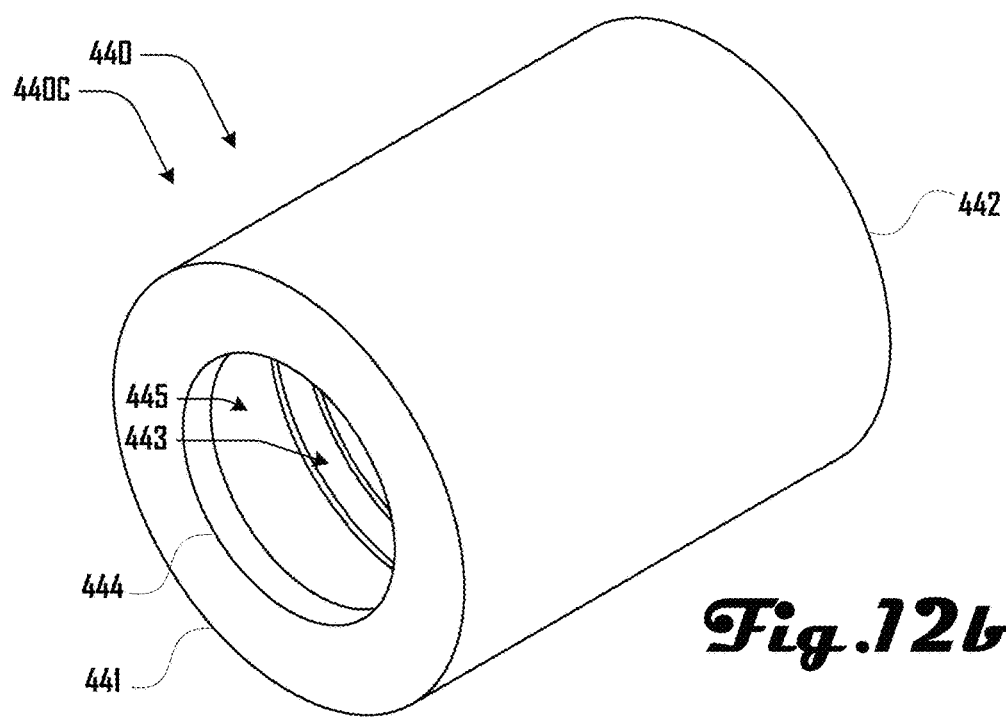
Figure 13A:
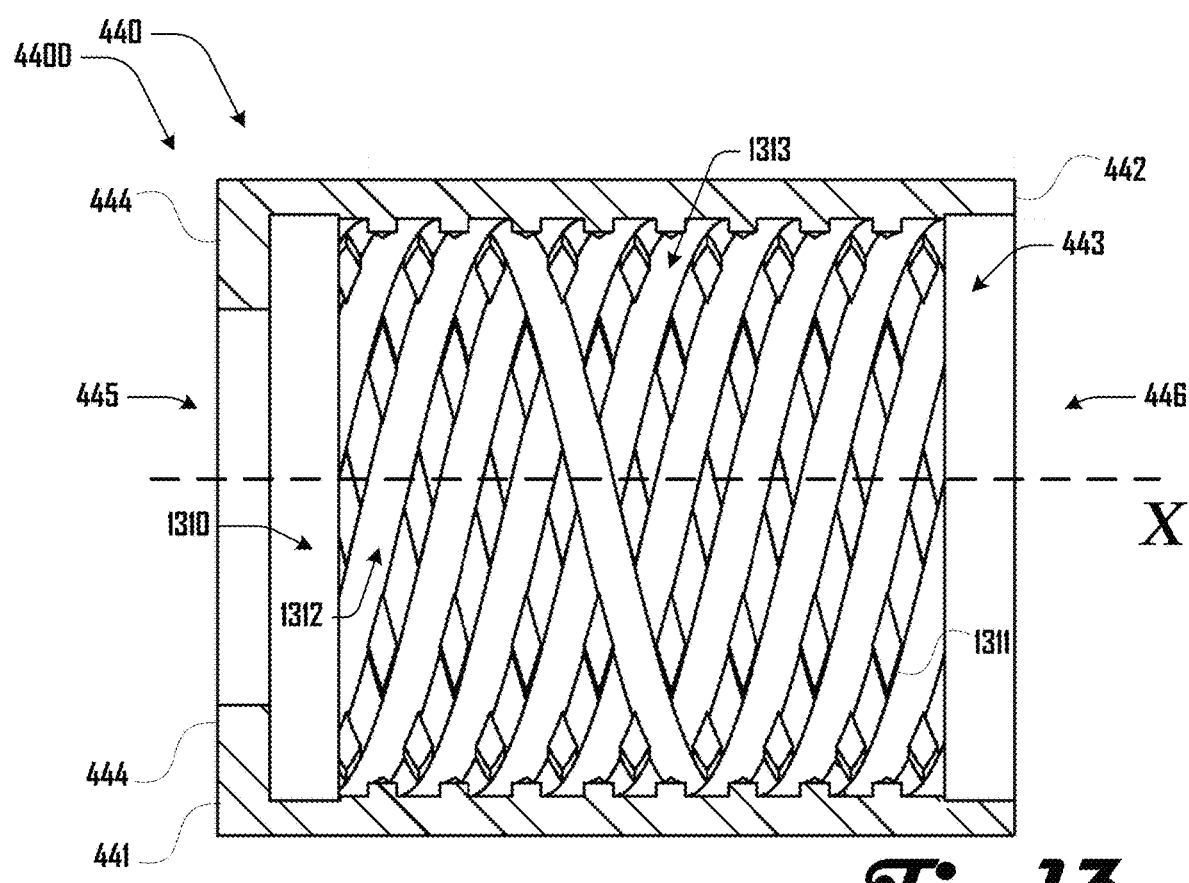
FIGS. 13a and 13b illustrate a respective cross-section view and perspective view of a ferrule in accordance with a further embodiment having diamond cleats within a cavity of the ferrule.
Figure 13B:
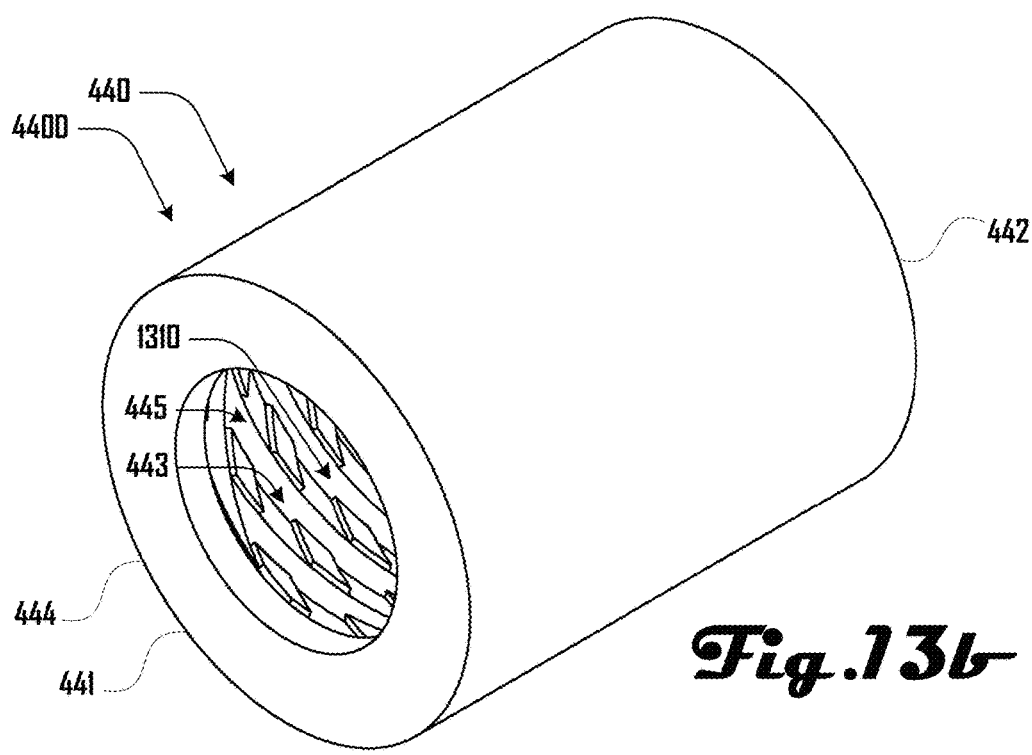

However, in further embodiments, such non-smooth features can be configured to provide a desirable engagement with the braid 200 of an over-braided liner 100B without causing undesirable damage to the braid 200 of the over-braided liner 100B. For example, some embodiments can include a ferrule 440B, as shown in FIGS. 13a and 13b, having an internal cavity that comprises diamond-shaped cleats 1311 formed by the machining of multiple opposing spiral grooves 1312, 1313 on the inside of the ferrule 440, which are configured to grip the braid 200 with minimal damage to the braid 200. For example, the diamond-shaped cleats 1311 can be configured to bite into the braid 200 to minimize cutting across the fibers of the braid 200. Similarly, a toothed profile 1210 as illustrated in FIGS. 12a, 12b and 21-24 can be configured to grip the braid 200 with minimal damage to the braid 200.

In various embodiments, cleats 1311, a toothed profile 1210, or the like can extend within one or more limited portions of the inside of the ferrule 440. In other words, one or more portions of the inside of the ferrule 440 can comprise non-smooth features and one or more portions can be smooth or flat. For example, FIG. 12a illustrates an inside of the ferrule 440 having a smooth portion extending to the first end 441 and a toothed profile 1210 extending to the second end 442. FIG. 13a illustrates the inside of a ferrule 400 having smooth portions extending from the first and second ends 441, 442 with cleats 1311 centrally located between the smooth portions. Similarly, FIGS. 21-24 illustrate the inside of a ferrule 400 having smooth portions extending from the first and second ends 441, 442 with a toothed profile 1210 centrally located between the smooth portions.

Additionally, while various embodiments include portions of a ferrule 400 having a consistent width or consistent average width, further embodiments can include tapered or rounded portions. For example, FIG. 11a illustrates the cylindrical body of a ferrule 440 having a consistent width from the first end 441 toward the second end 442, with small rounded portion at the second end. FIG. 12a illustrates the cylindrical body of a ferrule 440 having a consistent smooth width at the first end 441 and a toothed profile 1210 having a repetitive pattern that define a consistent average width.

FIG. 13a illustrates the inside of a ferrule 400 having consistent-width smooth portions extending from the first and second ends 441, 442 with cleats 1311 centrally located between the smooth portions having a consistent average width. FIG. 21 illustrates the inside of a ferrule 400 having consistent-width smooth portions extending from the first and second ends 441, 442 with cleats 1311 centrally located between the smooth portions having a consistent average width. The smooth portion at the first end 441 is shown having a greater width than the smooth portion at the second end 442.

FIGS. 21-24 illustrate the inside of a ferrule 400 having smooth portions extending from the first and second ends 441, 442 with cleats 1311 centrally located between the smooth portions having a consistent average width. The smooth portion at the first end 441 is shown comprising a consistent width, whereas the smooth portion at the second end 442 is shown defining a taper portion 2242. More specifically, the taper portion 2242 is shown tapering toward the second end 442 from a larger width to a smaller width. In various embodiments, having a taper portion 2242 at the second end 442 of a ferrule 440 can be desirable for providing a smooth transition for the braid 200 from high compression inside the fitting to low compression outside the fitting.

As discussed herein, a stem 420 and ferrule 440 can be coupled to an over-braided liner 100B in various ways. For example, the second end 423 of the stem 420 can be inserted into the liner cavity 405 at an end 406 of the over-braided liner 100B such that the tip 433 and coupling body 432 are disposed within the liner cavity 405. The ferrule 440 can slide over the stem 420 and over the end 406 of the over-braided liner 100B such that the end 406 of the over-braided liner 100B is disposed within the cavity 443 of the ferrule 440 with the stem 420 extending though the coupling orifice 445 of the ferrule 440.

The lip 444 of the ferrule 440 can be positioned about the coupling groove 431 and the ferrule 440 can be crimped such that the lip 444 engages and couples with the coupling architecture 428, which can include the lip 444 engaging one or both of the first and second rims 429, 430 and extending into the coupling groove 431. FIG. 4b illustrates one example engagement of the lip 444 and coupling architecture 428, wherein the lip 444 extends from the ferrule 440 at an obtuse angle and the lip 444 extends into the coupling groove 431, but does not extend to the bottom of the coupling groove 431.

In some embodiments, the lip 444 can initially be disposed substantially perpendicular to the main axis X of the ferrule 440 (e.g., as illustrated in FIGS. 11a, 12a, 13a) and assume an angled configuration (e.g., as illustrated in FIG. 4b) when the ferrule 440 is crimped or otherwise coupled about the over-braided liner 100B and stem 420. However, in further embodiments, the lip 444 can be disposed at any suitable angle relative to the main axis X of the ferrule 440 before and after the ferrule 440 is coupled to the stem 420. In some embodiments, the lip 444 can change angle relative to the main axis X as a result of such coupling to a stem 420 or can maintain an angle before and after such coupling. For example, as illustrated in FIG. 21, the lip 444 of the ferrule 440 can extend into the coupling groove 431 at substantially a 90° angle or substantially perpendicular to the main axis X.

Additionally, while FIG. 4b illustrates one example coupling where the lip 444 extends into only a limited portion of the coupling groove 431, in further embodiments, the lip 444 can be configured to extend further within the coupling groove 431 and can be configured to engage a bottom of the coupling groove 431 in some examples. For example, as illustrated in FIG. 21, the lip 444 of the ferrule 440 can extend into and engage a bottom of the coupling groove 431. Accordingly, the example coupling configuration of FIG. 4b should not be construed to be limiting on the numerous coupling configurations that are within the scope and spirit of the present disclosure.

Additionally, as illustrated in FIG. 4b, the coupling groove 431 can be a bare groove defined by the first and second rim 429, 430. However, in further embodiments, the coupling groove 431 can comprise a material or be partially or fully filled. For example, in some embodiments, a rubber, plastic or metal gasket, or the like, can be disposed within the coupling groove 431 and the lip 444 of the ferrule 440 can engage such a gasket. In further embodiments, a fluid such as a resin, adhesive, epoxy, wax, or the like, can be disposed within the coupling groove 431, which can generate a seal with the lip 444 of the ferrule 440 as described in more detail herein.

FIGS. 4a and 4b illustrate one example pairing of a stem 420 and ferrule 440, but in further embodiments, any suitable pairing of stems 420 and ferrules 440 disclosed herein can be employed. For example, any of the stem embodiments 420A-G can be paired with any of the ferrule embodiments 440A-D. In one specific example, as illustrated in FIG. 21 the stem 420G can be paired with the ferrule 440C.

In various embodiments, the fittings 400 can be crimped onto an over-braided liner 100B that includes resin on the braid 200 while the over-braided liner 100B is wet and before such resin on the braid 200 has dried and/or cured. In some embodiments, the fittings 400 can be crimped onto a resinated over-braided liner 100B in a multiple-step crimping process. For example, in one embodiment a ferrule 440 can receive a first crimping over a resinated over-braided liner 100B when such resin is wet or un-cured and then receive a second crimping over the resinated over-braided liner 100B when the resin is dry or cured. Further embodiments can include any suitable plurality of successive crimping steps during the drying or curing process of a resinated braid 200.

Such multi-step crimping of a resinated over-braided liner 100B can be performed in various suitable ways. For example, in one embodiment, a first under-crimping can be performed while the resinated braid 200 is still wet or uncured and a second full-crimping can be performed once the resinated braid 200 is dry or cured. In other words, the first crimping stage can be performed to a deliberately under-crimped diameter compared to a desired fully crimped diameter and the second crimping stage can be performed to the desired fully crimped diameter. In further embodiments, multi-stage crimping can be performed in various suitable ways. For example, crimping can occur in stages along a length of the ferrule 440, at different portions about the diameter of the ferrule 440, or the like.

Figure 25:
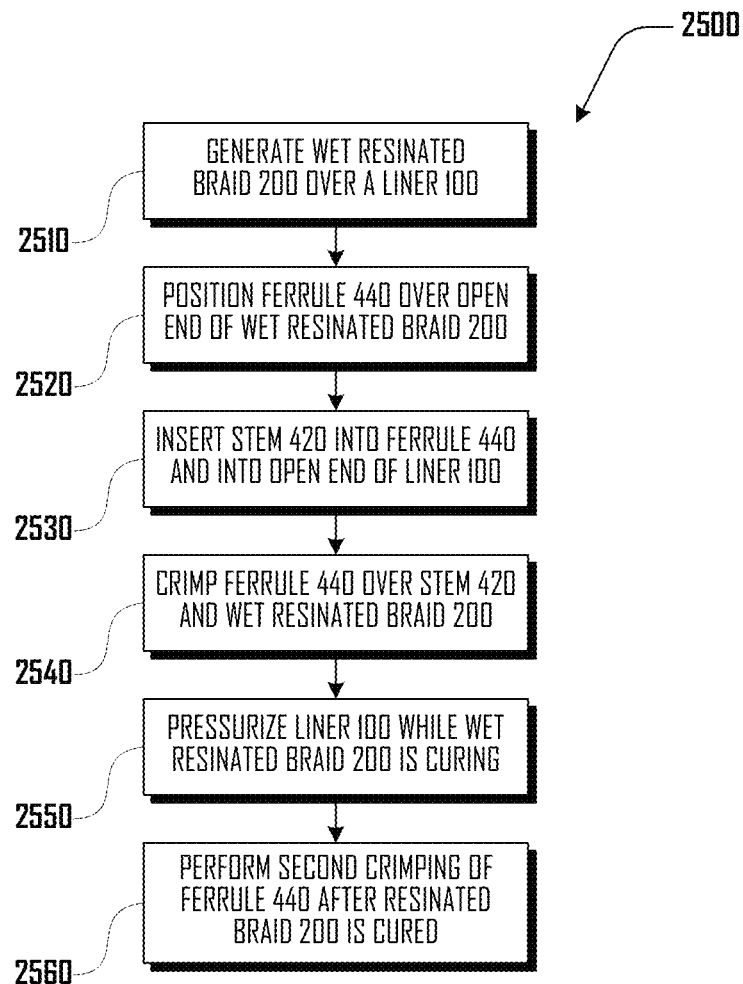
FIG. 25 is a block diagram of one example method of fixing fittings on an open end of a liner 100 in accordance with one embodiment.

FIG. 25 illustrates one example method 2500 of fixing fittings 400 on an open end 406 of a liner 100 in accordance with one embodiment. The method 2500 begins at 2510 where a wet resinated braid 200 is generated. For example, methods of generating a wet resinated braid 200 on a liner 100 are discussed in U.S. patent application Ser. No. 15/368,182 entitled SYSTEMS AND METHODS FOR LINER BRAIDING AND RESIN APPLICATION, filed Dec. 2, 2016 which is incorporated herein by reference in its entirety and for all purposes. In various embodiments, any suitable number of layers of braiding can be applied over a liner, including one, two, three, four, five, six, seven, eight, nine, ten, or the like. Additionally, in some embodiments a braid 200 can be absent or one or more braid layers can be without resin, or the like.

Returning to the method 2500, a ferrule 440 is positioned over an open end 406 of the wet resinated braid 200 disposed on the liner 100, and at 2530, a stem 420 is inserted into the ferrule 440 and into the open end 406 of the liner 100. For example the end 406 of the braided liner 100B can be inserted into the opening 446 at the second end 442 and into the cavity 446 until the braided liner 100B engages the lip 444 with the opening 445 communicating with the interior cavity 405 defined by the liner 100. The second end 423 of the stem 420 can be inserted into the opening 446 of the ferrule 440 and into the interior cavity 405 defined by the liner 100. In various embodiments, the stem 420 can be extended into the interior cavity 405 until a nut 426, neck 427, second rim 429, or the like, of the stem 420 engages the first end 441 of the ferrule 440. In various embodiments, the stem 420 can be extended into the interior cavity 405 until the lip 444 of the ferrule 440 is positioned over or within the coupling groove 431 of the stem 420.

Returning to the method 2500, at 2540, the ferrule 440 is crimped over the stem 420 and the wet resinated braid 200, and at 2550, the liner 100 is pressurized while the wet resinated braid 200 is curing. At 2560, a second crimping of the ferrule 440 is performed after the resinated braid 200 is cured.

For example, the lip 444 of the ferrule 440 can be positioned over or within the coupling groove 431 of the stem 420. The body of the ferrule 440 can be compressed or deformed along its length in one or more locations to compress the diameter or volume of the cavity 446 of the ferrule 440 so that the braided liner 100B is coupled between the stem 420 and ferrule 440.

In various embodiments, a multi-step crimping process can be desirable because it can provide for a superior seal between the fittings 400 and the braided liner 100B. For example, a first crimp onto a wet braid can cause the wet composite of the braid to conform to the ferrule (e.g., conform to a ribbed profile 510 and/or toothed profile 1210 of the stem 420 or ferrule 440) and can allow the liner 100 to hold air pressure during the cure cycle. Conforming the braid 200 to the ferrule 440 and/or stem 420 can prevent the fitting 400 from slipping off the tank 100B under pressure. Pressurizing tanks 100B with fluid while the resinated braid 200 is curing can improve the circularity of the liner 100 and can put the braid 200 in tension, which can improve the seal and performance provided by the braid 200 and liner 100. Crimping the fittings 400 as second time after curing can be desirable in some embodiments because during the cure cycle, high temperatures can cause the liner 100 to relax, releasing internal compressive stress from the first crimping stage via creep. The second crimping stage can re-apply force into the braid 200 and liner 200, which can generate a superior seal compared to a single crimping.

However, in some embodiments, it can be desirable to couple fittings 400 without a second crimping. For example, further embodiments can comprise a fitting design that allows for a seal to be established between a stem 410 and liner 100 through the tightening of a threaded connection. Some such embodiments can translate torque between the stem 420 and ferrule 440 into sealing force, through a conical stem-liner interface, or the like.

Crimping the ferrule 440 can be done in various suitable ways, including with a crimping machine, crimping tool, or the like. In some embodiments, the first and second crimp can be the same crimping method or can be a different crimping method. Additionally, further embodiments can comprise any suitable plurality of crimping stages, including two, three, four, five, or the like. For example, in some embodiments crimping can be performed during curing of a resinated braid 200.

Also, while curing of a resinated braid 200 is discussed in this example method 2500, further embodiments can include other treatments of a braid 200 or the like, which may or may not include a resin. In other words, further embodiments can include treatment of a braid 200 that changes the braid 200 from a first state to a second state that is different than the first state. For example, in various embodiments, changing from a first state to a second state can include a braid 200 becoming more rigid, harder, less soft, less-flexible, less elastic, and the like. Treatment of a braid 200 can including drying (e.g., in an over or air drying), light exposure, application of a fluid to the braid, and the like.

Figure 26:
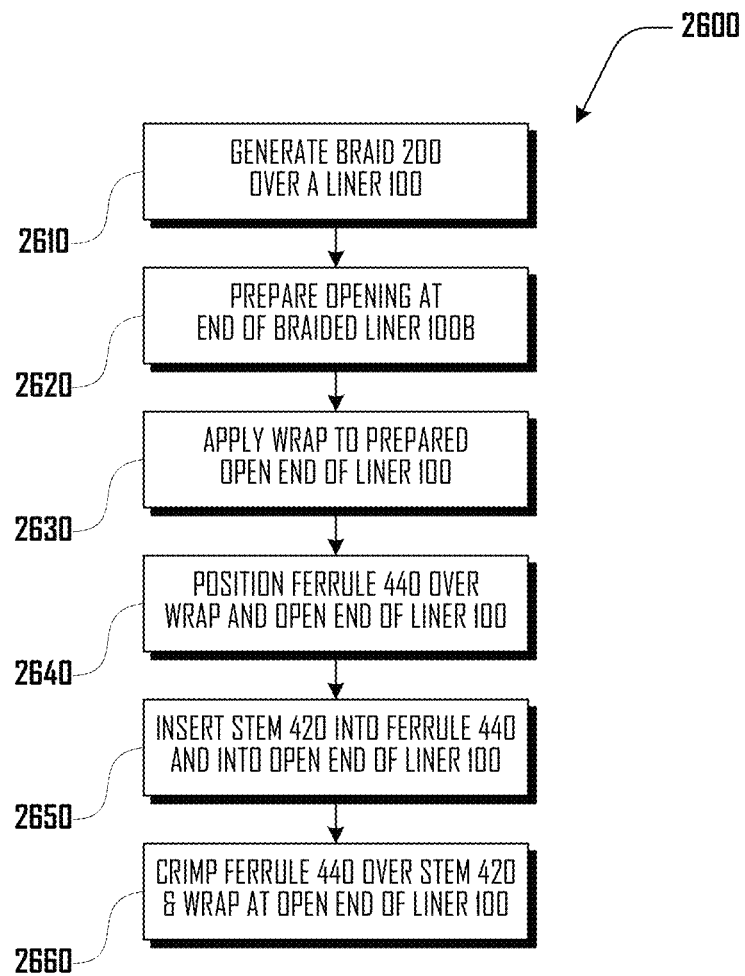
FIG. 26 is a block diagram of another example method of applying fittings to a braided liner.

FIG. 26 illustrates another example method 2600 of applying fittings 400 to a braided liner 100B. The method 2600 begins at 2610 where a braid 200 is generated over a liner 100. As discussed herein, such a braid 200 can comprise one or more layers and be generated in any suitable way.

At 2620, an opening is prepared at an end 406 of the braided liner 100B. In some embodiments, a braided liner 100B can be cut and prepared before fittings 400 are applied. For example, in various embodiments, it can be desirable to couple fittings 400 with a cuff 115 of the liner 100 because the cuff 115 can have a smooth profile and can have a smaller diameter than the tubing portion 130 of the liner 100 (see e.g., FIG. 20). In some embodiments, the liner cuff 115 must be located, which may be difficult because the liner 100 can be hidden under one or more layers of braid 200, which can obscure the liner cuff 115.

Figure 27A:
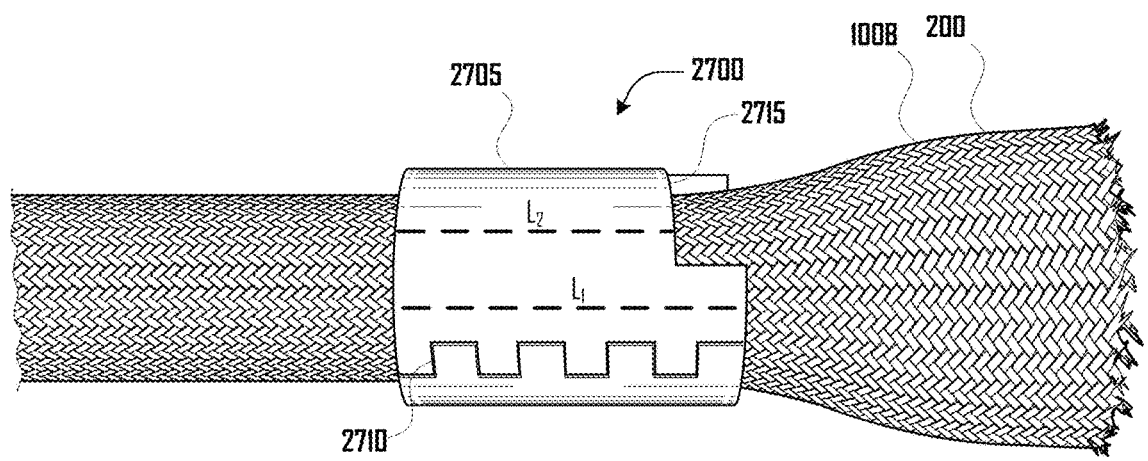
FIGS. 27a and 27b illustrate a locator tool being used to identify locations on a liner and having a cylindrical body, a hinge and a notch in a portion of the body.
Figure 27B:
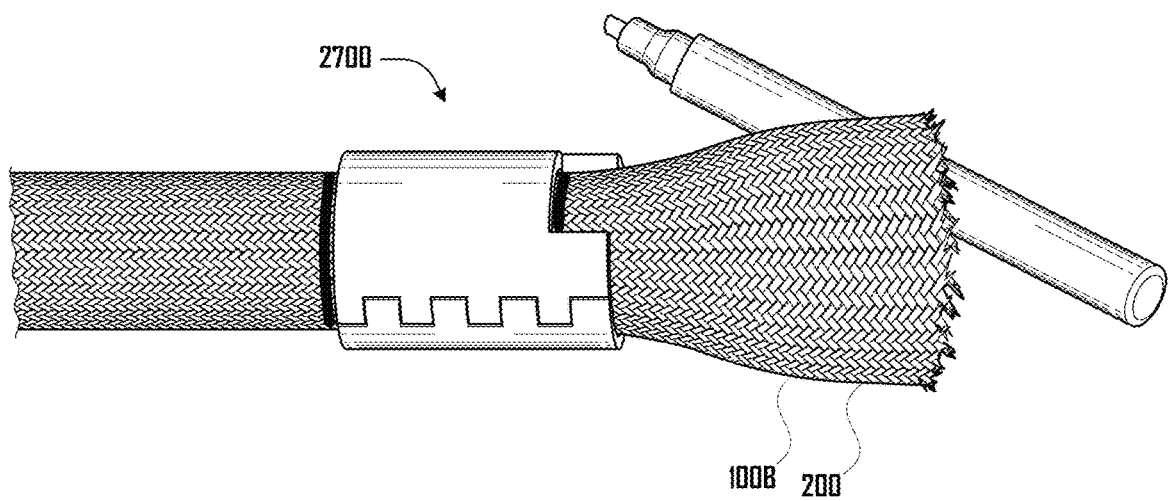

Accordingly, some embodiment can include use of a locator tool 2700 as shown in FIGS. 27a and 27b, which can be used to identify various locations on a liner 100 even if the liner 100 is braided. The locator tool 2700 can comprise a cylindrical body 2705 having a hinge 2710 and a notch 2715 in a portion of the body 2705. The body 2705 can define lengths $L_1$ and $L_2$. The locator tool 2700 can be sized based on geometry of the braided liner 100B including diameters and lengths of the connector portion 110, tubing portion 130, taper portion 125, and the like. The hinge 2710 can allow the locator tool 270 to be opened and then closed onto the exterior of the braid 200 and pushed against the taper portion 125 of the liner 100 as shown in FIG. 27a. In such a configuration, ends of the locator tool 2700 and edge within the notch 2715 can denote the location of various parts of the liner, including the ends of the cuff 115. Accordingly, lengths $L_1$ and $L_2$ or the difference between then can correspond to the various lengths of the liner 100 and be configured such that the notch 2715 and/or one or both ends of the locator tool 2700 correspond to desired locations of a liner 100 that is braided. For example, the end within the notch 2715 and the opposing end of the locator tool 2700 can be disposed at ends of the cuff 115. As shown in FIG. 27, the braid 200 can be marked as shown in FIG. 27b, at the ends or within the notch 2715, and then cut in various suitable ways.

Figure 28A:
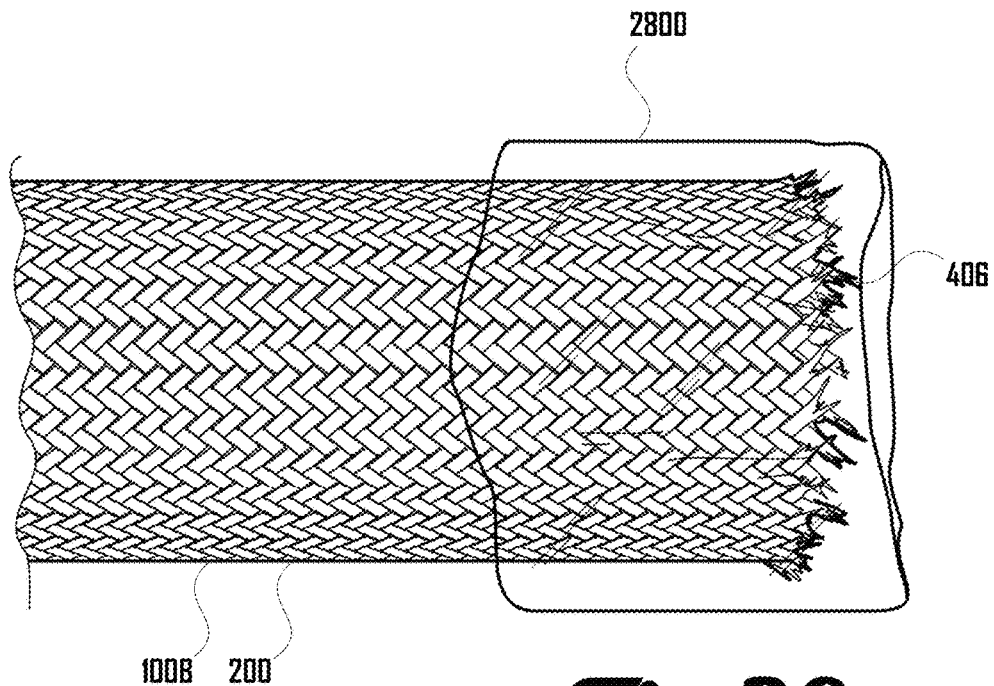
FIGS. 28a and 28b illustrate a cylindrical heat shrink wrap being disposed over an open end of a braided liner.
Figure 28B:
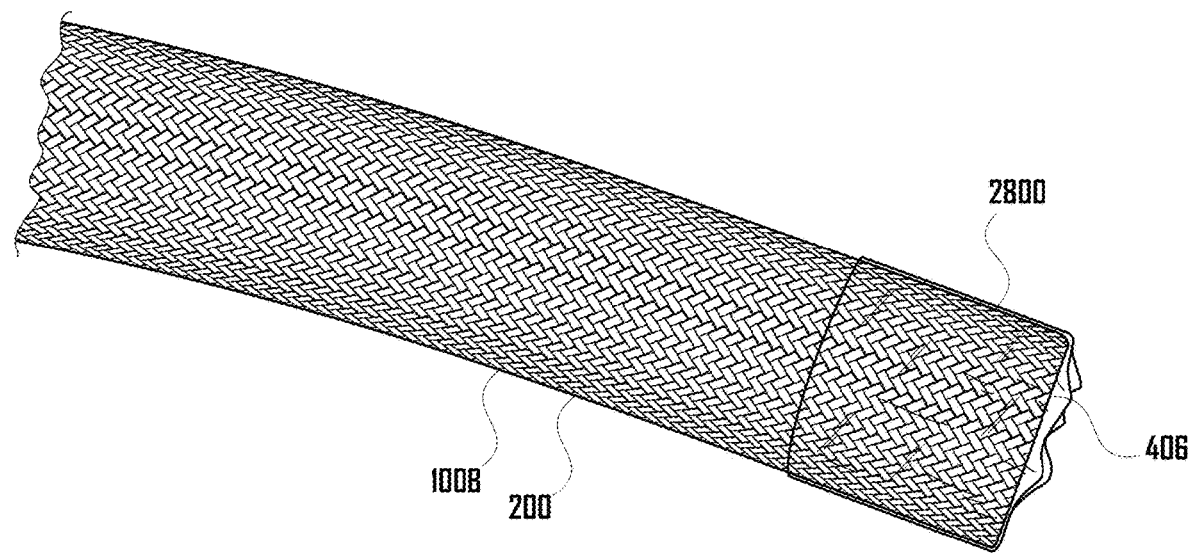

Returning to the method 2600, a wrap is applied to the prepared end of the liner 100. For example, FIGS. 28a and 28b illustrate an example of heat shrink wrap 2800 being applied to an open end 406 of a braided liner 100B. FIG. 28a illustrates a cylindrical heat shrink wrap 2800 being disposed over the open end 406 of a braided liner 100B with an overhang of length N extending past the face of the open end 406 of the braided liner 100B. Heat can be applied to the heat shrink wrap 2800, which can shrink the heat shrink wrap 2800 as shown in FIG. 28b such that the heat shrink wrap 2800 encircles the face of the open end 406 of the braided liner 100B.

Although a heat shrink wrap 2800 can be used in some examples, in further examples, various suitable tapes, plastic wraps, or the like can be applied to an open end 406 of a braided liner 100B. Applying a wrap to an open end 406 of a braided liner 100B can be desirable in various embodiments to prevent the braid 200 from fraying when a ferrule 440 is placed over the braided liner 100B as described herein. Additionally, such a wrap can improve a seal between the ferrule 440 and the surface of the braided liner 100B.

Returning again to the method 2600, at 2640, a ferrule 440 is positioned over the wrap and open end 406 of the liner 100, and at 2650, a stem 420 is inserted into the ferrule 440 and into the open end 406 of the liner 100. At 2660, the ferrule 440 is crimped over the stem 420 and wrap at the open end 406 of the liner 100. Such positioning of the stem 420 and ferrule 440 and crimping of the ferrule 440 can be done as described herein. Additionally, in various embodiments, any suitable elements or step of the method 2600 and method 2500 of FIG. 25 can be combined. For example, in some embodiments, a wrap can be applied to a wet resinated braid 200. Accordingly, the example methods 2500, 2600 should not be construed to be limiting on the wide variety of additional or alternative methods that are within the scope and spirit of the present disclosure.

Various embodiments of fittings 400 can be desirable over existing fittings for coupling with a liner 100 and/or or braiding 200 as discussed herein. For example, no commercially available tank fittings are rated for 70 MPa nominal working pressure (NWP) interface with the connector portion 110 of liner 100 and/or or braiding 200 as described herein. However, the example embodiments of fitting 400 described herein have been tested and can be rated for 70 MPa nominal working pressure. Accordingly, various embodiments herein can be rated for equal to or greater than 70 MPa nominal working pressure.

Additionally, existing cylinders connect with a fuel system using an end boss. End bosses are large, heavy, and must be molded directly into a tank. However, various embodiments of fitting 400 described and shown herein do not require or can be implemented without an end boss, and thus can save cost and weight and be easier to produce. Accordingly, the novel composite pressure vessels discussed herein that comprise a polymer liner that do not require an end boss or that can be implemented without an end boss can be beneficial over existing fittings.

As discussed herein, the fittings 400 and a braided liner 100B can be used to generate a fluid storage tank configured to store pressurized fluid. Various suitable fluids can be stored in such a fluid storage tank including hydrogen, natural gas, air, and the like. Accordingly, in embodiments where metal fittings 400 are in contact with compressed hydrogen, for example, it can be desirable for such embodiments to be resistant to hydrogen embrittlement, or weakening of the metal fitting and fracturing resulting from hydrogen diffusion into the metal fittings. Metals and surface coatings that are resistant to hydrogen induced fracturing can therefore be desirable in various embodiments.

Turning to FIGS. 14a and 14b, a fitting assembly 1400 is illustrated in accordance with one embodiment 1400A configured to couple with an over-braided liner 100B. The fitting assembly 1400 comprises a plug 1420 and a pair of shells 1440. As shown in this example embodiment 1400A, the plug 1420 can be configured to reside within an interior cavity 405 defined by the liner 100 and more specifically be sized and contoured to correspond to a tubing portion 130 and taper portion 125 of the liner 100.

However, in further embodiments, the plug 1420 can be configured to correspond to only the tubing portion 130, taper portion 125 or connector portion 110. Alternatively, the plug 1420 can be configured to correspond to the connector portion 110 and the taper portion 125. In still further embodiments, a plug 1420 can be configured to couple with a liner 100 having various suitable shapes and sizes, so the example embodiments disclosed herein should not be construed to be limiting on the wide variety of alternative embodiments of a plug 1420 that are within the scope and spirit of the present disclosure.

The plug 1420 can define a bore 1421 that extends along a main axis X of symmetry between a first and second end 1422, 1423 of the plug 1420. The bore 1421 or other structure at the first end 1422 can be configured to couple with various systems such that suitable fluids can be introduced to and/or removed from an interior cavity 405 defined by the liner 100. For example, where such a fluid comprises hydrogen, the first end 1422 can be directly or indirectly coupled with a hydrogen filling station to fill the interior cavity 405 defined by the liner 100 with hydrogen and can be directly or indirectly coupled with a vehicle engine to provide hydrogen fuel to the vehicle engine from hydrogen stored within the interior cavity 405 defined by the liner 100.

As illustrated in the example of FIG. 14a, the bore 1421 can comprise a narrower portion proximate to the second end 1423 and a larger portion proximate to the first end 1422. Further embodiments can comprise of any suitable size(s) and/or shape(s) of bore 1421. For example, in some embodiments having a larger diameter bore 1421 can be desirable to increase the flow rate through the bore 1421, which can be desirable for faster filling.

Additionally, various components can be configured to extend into the fitting assembly 1400 or into the cavity 405 defined by the over-braided liner 100B. For example such components can include at least a portion of a gas injector, a gas receiver (e.g., including a filter and an excess flow valve), a temperature sensor, a pressure sensor, a bleed valve, a temperature pressure relief device (TPRD), thermocouple, and the like. In some embodiments such components can be interested into and reside within the bore 1421 of the plug 1420. In various embodiments, it can be desirable to have a large diameter bore 1421 to accommodate such components. For example, it can be desirable to have a bore 1421 large enough to allow a ¼" thermocouple to be inserted through the fitting 400 while still retaining enough free area as to not impede hydrogen flow from a 6 mm ID hose. Additionally, interfacing with an on-tank valve and other components that may be required for in-vehicle use, for example, can influence an end connection thread size and/or stem bore diameter.

At the first end 1422, the plug can comprise a base 1426 that extends to a linear portion 1432 having a radial face that is substantially parallel to the main axis X of symmetry. A plug tip 1433 can extend from the linear portion 1432 at the second end 1423. As shown in this example, the linear portion 1432 and plug tip 1433 can be configured to engage with an end 406 of the over-braided liner 100B and be configured to mirror the contours of the interior cavity 405 defined by the end 406 of the liner 100. Accordingly, the linear portion 1432 and plug tip 1433 can be configured to generate a seal with the end 406 of the liner 100 as described in more detail herein.

As illustrated in FIG. 14b, the fitting assembly 1400 can comprise a first and second shell 1440A, 1440B that extend between a first and second end 1441, 1442. The shells 1440 can define respective portions of a cavity 1443 that extends from a first opening 1445 at the first end 1441 of the shells 1440 to a second opening 1446 at the second end 1442 of the shells 1440. The cavity 1443 can extend linearly from the first opening 1445 and narrow in a sloping manner toward the second end 1442 that corresponds to an outer contour of the over-braided liner 100B. Proximate to the second end 1442, the second opening 1446 can open via a rounded contour that extends away from and no longer corresponds to the outer contour of the over-braided liner 100B at a portion of the second opening 1446.

Such embodiments, where a portion of the cavity 1443 at the first end 1441 of the shells 1440 is configured to correspond to an outer contour of the over-braided liner 100B and where a portion of the cavity 1443 at the second end 1442 of the shells 1440 is not configured to correspond to an outer contour of the over-braided liner 100B can be desirable for providing a seal between the plug 1420, over-braided liner 100B and shells 1440 at the first end 1441 and allowing for movement of the over-braided liner 100B that extends from the second opening 1446. Additionally, the rounded contour of the second opening 1446 can help prevent damage to the over-braided liner 100B where movement of the over-braided liner 100B occurs at the second end 1442. In other words, by contacting the rounded contour of the second opening 1446, the over-braided liner 100B may not experience damage that might occur if the second opening 1446 had edges or other non-rounded features.

The plug 1420 and shells 1440 can be coupled together in various suitable ways. For example, as shown in FIGS. 14a and 14b, a plurality of plug bolts 1450 can extend through plug bolt holds 1427 defined by the base 1426 of the plug 1420 and into the shells 1440 at the first ends 1441. In various embodiments, the shells 1440 can comprise holes that include threads corresponding to the plug bolts 1450, which can provide for the plug 1420 to be securely coupled with the shells 1440.

Additionally, the shells 1440 can be coupled together via shell bolts 1460 that extend through shell bolt holes 1447 defined by the shells 1440 and coupled via nuts 1461. For example, as illustrated in FIG. 14*b* first shell bolts 1460A can extend through first bolt holes 1447A defined the first and second shell 1440A, 1440B at the first ends 1441 of the first and second shells 1440A, 1440B. First nuts 1461A can couple with ends of the first shell bolts 1460A. Additionally, second shell bolts 1460B can extend through second bolt holes 1447B defined by the first and second shell 1440A, 1440B at the second ends 1442 of the first and second shell 1440A, 1440B. Second nuts 1461B can couple with ends of the second shell bolts 1460B.

While specific numbers and configurations of bolts 1450, 1460 are illustrated in the example embodiment 1400A shown in FIGS. 14*a* and 14*b*, in further embodiments, any suitable number and configuration of bolts can be used to couple the shells 1440 and the plug 1420. Additionally, in further embodiments, any suitable alternative or additional coupling and/or mating structures can be used to couple the shells 1440 and the plug 1420. For example, as illustrated in FIG. 15, in one embodiment, coupling plates 1510 can be positioned on opposing sides of the shells 1440 with bolts 1511 extending between and coupling the coupling plates 1510. In further examples, complementary slots and pins, tongue and groove, or the like, can be used to couple the shells 1440 and plug 1420.

Furthermore, although a first and second shell 1440A, 1440B are illustrated in FIG. 14*b* as forming symmetric halves of the cavity 1443 for holding the over-braided liner 100B, in further embodiments, the shells 1440 may not be symmetric. Additionally, in further embodiments, a single shell 1440 can define cavity 1443, or any suitable plurality of shells 1440 (e.g., two, three, four, five, six, and the like) can define a cavity 1443, and such a plurality of shells 1440 may or may not be symmetrical.

The shells 1440 and plug 1420 can be coupled with an over-braided liner 100B in accordance with various suitable methods. For example, in one embodiment, the first and second shell 1440A, 1440B are aligned and bolted together on the exterior of the taper 125 of the over-braided liner 100B. The plug 1420 is then inserted into the cavity 405 at the end 406 of the over-braided liner 100B and connected to the exterior shells 1440 using axial bolts 1450 which are oriented parallel to the main axis X of the fitting assembly 1400. When tightened, the axial bolts 1450 can compress the liner 100 and the braid 200 between the plug 1420 and exterior shells 1440. The plug 1420 can be configured to deform the plastic liner 100 into a conical shape, creating a substantial sealing surface operable for use as high pressure fittings. The internal geometry defining the cavity 1443 of the shells 1440 can provide a force normal to the sealing surface of the over-braided liner 100B, blocking high pressure gas from escaping when in use.

Additionally, the axial bolts 1450 can serve to resist an axial force imposed on the plug 1420 by an internal pressure within the cavity 405 of the over-braided liner 100B. The tapered geometry of the over-braided liner 100B can be trapped by the exterior shells 1440, preventing the braiding 200 and liner 100 from separating from the plug 1420 during pressurization in the axial direction.

In some embodiments, the shells 1440 and plug 1420 can be coupled to an over-braided liner 100B with a resinated braid 200 that is wet or uncured. In some embodiments, the shells 1440 and plug 1420 can be coupled to an over-braided liner 100B with a resinated braid 200 that is wet or uncured and the over-braided liner 100B can be allowed to dry or cure while in the coupled configuration.

Further embodiments can include a multi-step coupling process with a resinated braid 200 that is wet or uncured. For example, the shells 1440 and plug 1420 can be coupled to an over-braided liner 100B that is wet or uncured with the axial bolts 1450 adjusted to a first tightness while the braid 200 is wet or uncured and once the braid 200 is dry or cured, then the axial bolts 1450 can be adjusted to a second tightness. In one embodiment, the first tightness can be less than the second tightness. In further embodiments, the shell bolts 1460 can be set at a first and second tightness before and after the braid 200 is dry or cured.

Portions of the fitting assembly 1400 (e.g., the plug 1420 and shells 1440) can be made of various suitable materials including metal, plastic, or the like. In one preferred embodiment, the fitting assembly can comprise aluminum. In some embodiments, the fitting assembly 1400 can be configured to be in contact with compressed hydrogen and can be configured to be resistant to hydrogen embrittlement or weakening of the fitting assembly 1400 and fracturing resulting from hydrogen diffusion into the fitting assembly 1400. For example, the fitting assembly 1400 can comprise a material and/or surface coating that is resistant to hydrogen induced fracturing.

Additionally, a fitting assembly 1400 can be configured or rated for use with pressurized fluids including being rated for use at 10 MPa, 25 MPa, 50 MPa, 70 MPa, 90 MPa, 110 MPa, 130 MPa, 150 MPa, or the like. In one preferred embodiment, a fitting assembly 1400 comprising a plug 1420 and shells 1440 as described herein can be rated for use with pressurized hydrogen at 70 MPa nominal working pressure.

In another preferred embodiment, a fitting assembly 1400 can be rated for use with compressed natural gas (CNG) at 25 MPa nominal working pressure. Although various embodiments of a fitting assembly 1400 discussed herein can be configured for use with fuel fluids such as hydrogen, compressed natural gas, further embodiments can be configured for use with any suitable fluid at various suitable pressures. Additionally, some embodiments can be configured for use with cryogenic fluids, room-temperature fluids, or heated fluids.

As discussed herein, the shells 1440 and plug 1420 can be configured in various suitable alternative ways. For example, FIGS. 16*a* and 16*b* contrast two example embodiments 1400A, 1400B of a fitting assembly 1400. FIG. 16*a* illustrates the embodiment 1400A of FIGS. 14*a* and 14*b* discussed above wherein the second end 1423 of the plug 1420 extends to plane $Y_{PT1}$ which is disposed with within the cavity 1443, before the plane of the face of the second end 1442 of the shell 1440.

In contrast, FIG. 16*b* illustrates a second embodiment 1400B wherein the second end 1423 of the plug 1420 extends to plane $Y_{PT2}$ which is past the plane of the face of the second end 1442 of the shell 1440. In other words, FIG. 16*b* illustrates an example embodiment where the second end 1423 of the plug 1420 extends out of the second opening of the cavity 1443. In further embodiments, the second end 1423 of the plug 1420 can be configured to extend flush with the plane of the face of the second end 1442 of the shell 1440.

Additionally, FIG. 16b illustrates that some embodiments can comprise a shoulder relief 1650 defined by the first opening 1445 of the cavity 1443 at the first end 1441 of the shell 1440. As shown in this example embodiment 1400B, the shoulder relief 1650 can comprise a portion of the first opening 1445 having a diameter that is a bit larger than and flares out from a contour that would match the over-braided liner 100B. Such a shoulder relief 1650 can be desirable because when tightening the axial bolts 1450, the braid 200 can be displaced into the shoulder relief 1650. In embodiments where the plug 1420 and shells 1440 are coupled with an over-braided liner 100B having a wet or uncured resinated braid 200, such a displaced portion of the wet or uncured resinated braid 200 can then dry and harden to form a braid shoulder or ring in the over-braided liner 100B, which serves to resist axial forces that may otherwise cause the over-braided liner 100B to slip out of the fitting assembly 1400.

Turning to FIGS. 17a and 17b a further embodiment 1400C of a fitting assembly 1400 is illustrated. In this embodiment 1400C, the cavity 1443 can be defined by an insert 1710, which can be separable from a solitary shell 1440 that supports the insert 1710. As shown in this example, the insert 1710 can be defined by a first and second portion 1710A, 1710B, but in further embodiments, the insert 1710 can comprise a single piece or can comprise any suitable plurality of pieces. Embodiments comprising an insert 1710 defined by a plurality of pieces can have the inserts 1710 coupled via a locating pin 1711 and slot 1714 and/or bolt 1713 and bolt slot 1712. Locating pins 1711 can be desirable to ensure the conical inserts 1710A, 1710B are mated precisely with each assembly, increasing repeatability of results and eliminating potential failure modes.

In some embodiments, having a multi-part insert 1710 with a desired internal geometry and a conical external surface that is forced into a conical ring can be desirable. For example, force resulting from tightening the axial bolts 1450 against the plug 1420 can cause the two conical inserts 1710A, 1710B to be joined. Such a configuration can eliminate gaps resulting from bolt bending/stretch. Furthermore, such a configuration can increase the ease of assembly by reducing the number of bolts required to assemble the fitting assembly 1400C thus reducing risk associated with potential bolt stretch or loosening.

Additionally, FIG. 17a illustrates that the insert 1710 can comprise a shoulder relief 1750 defined by the first opening 1445 of the cavity 1443 at the first end 1441 of the insert 1710. As shown in this example embodiment 1400C, the shoulder relief 1750 can comprise a portion of the first opening 1445 having a diameter that is a bit larger than and flares out from a contour that would match the over-braided liner 100B.

As discussed herein, the plug 1420 and shell 1440 can be coupled in various suitable ways, including via axial bolts 1450 that extend into bolt holes 1760 defined by the body of the shell 1440. Although some embodiments can include a threaded fitting between the axial bolts 1450 and bolt holes 1760, in further embodiments, such as the embodiment 1400C of FIGS. 17a and 17b, helicoil inserts 1755 can be used in place of tapped bolt holes 1760, which can be desirable for increasing the lifespan of the bolt holes 1760 and bolts 1450.

As discussed herein, the shell 1440 and plug 1420 can be configured in various suitable alternative ways. For example, FIGS. 18a and 18b contrast two example embodiments 1400C, 1400D of a coupling architecture 1400. FIG. 18a illustrates the embodiment 1400C of FIGS. 17a and 17b discussed above where the second end 1423 of the plug 1420 extends to plane $Y_{PT3}$ which is disposed with within the cavity 1443, before the plane of the face of the second end 1442 of the shell 1440. In contrast, FIG. 18b illustrates a fourth embodiment 1400C wherein the second end 1423 of the plug 1420 extends to plane $Y_{PT4}$ which is further internally within the cavity 1443, before the plane of the face of the second end 1442 of the shell 1440. In further embodiments, the second end 1423 of the plug 1420 can be configured to extend flush with or extend past the plane of the face of the second end 1442 of the shell 1440.

Additionally, as illustrated in FIG. 19, in some embodiments, it can be desirable to have an O-ring 1900 disposed on the plug tip 1433 of the plug 1420. In further embodiments, one or more O-ring 1900 can be disposed on the linear portion 1432 and/or plug tip 1433. The O-ring 1900 can comprise various suitable materials including rubber, a plastic, a metal, or the like.

In some embodiments, preparing a fitting assembly 1400 with an over-braided liner 100B that is initially wet or uncured can comprise the use of a plurality of separate plugs 1420. For example, a shell 1440 and first curing plug 1420 can be coupled to an over-braided liner 100B that is wet or uncured with the axial bolts 1450 adjusted to a first tightness while the braid 200 is wet or uncured and once the braid 200 is dry or cured, then the first curing plug 1420 can be removed and a second fitting plug 1420 can be coupled with an over-braided liner 100B and shell 1440. In some embodiments, such a curing and fitting plug can have different profiles, diameters, and the like. In some embodiments, one or both of the curing and fitting plugs can comprise or be without an O-ring. Additionally, in some embodiments the first tightness can be greater than, equal to or less than the second tightness.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A fittings assembly comprising:
 a hollow liner defining a liner cavity and having one or more layers of braiding extending over an exterior of the liner, the liner including:
  a plurality of separate elongated rigid tubing portions having a first diameter,
  a plurality of separate connector portions having a second diameter that is smaller than the first diameter,
  taper portions disposed between and coupling successive separate tubing portions and connector portions, the liner folded to define a folded tank body having a first and second tank body end, with the elongated rigid tubing portions extending in parallel between the first and second tank body ends, with a first set of connector portions disposed at the first tank body end and a second set of connector portions disposed at the first tank body end; and
  an opening at an end portion of the liner at a connector portion, having the second diameter that is smaller than the first diameter, that communicates with the liner cavity, the end portion of the liner disposed at the first tank body end; and a fitting comprising:
  a stem including an elongated coupling body disposed within the liner cavity and engaging an internal portion of the liner at the end portion of the liner at the connector portion, having the second diameter that is smaller than the first diameter; and
  a ferrule including:
    a ferrule body having a first and second end;
    a lip defining a coupling orifice at the first end with the stem extending though the coupling orifice and engaging the lip, and
    a ferrule cavity defined by the ferrule body that extends between the first and second ends and opening to the coupling orifice at the first end and a ferrule opening at the second end, the opening at the end of the liner being disposed within the ferrule cavity with the ferrule surrounding the end portion of the liner and an end portion of one or more braid layers such that the liner end portion of the liner and the end portion of the one or more braid layers are coupled between the ferrule body and the coupling body of the stem.

2. The fittings assembly of claim 1, wherein an internal face of the ferrule body defines at least one of a toothed profile or cleats that extend into the ferrule cavity.

3. The fittings assembly of claim 1, wherein the stem comprises a coupling groove defined by a coupling architecture of the stem.

4. The fittings assembly of claim 3, wherein the lip of the ferrule extends into and is coupled within the coupling groove defined by the coupling architecture of the stem.

5. The fittings assembly of claim 1, wherein the stem comprises a nut disposed on a portion of the stem that is external to the ferrule cavity and liner cavity.

6. The fittings assembly of claim 1, wherein the stem extends from a first stem end to a second stem end with the second stem end disposed within the ferrule cavity and liner cavity and having a head disposed at the first stem end, the stem further defining a bore that extends from the first stem end to the second stem end.

7. The fittings assembly of claim 1, wherein the fitting of the fittings assembly consists essentially of:
  the stem including the elongated coupling body disposed within the liner cavity and engaging the internal portion of the liner at the end of the liner; and
  the ferrule.

8. The fittings assembly of claim 1, wherein the end portion of the liner at the connector portion comprises:
  a terminal rigid elongated cuff having a smooth and non-corrugated profile along the length of the cuff on both an external cuff face and an internal cuff face, and
  an elongated flexible corrugated ribbed portion adjacent to the terminal rigid elongated cuff,
  wherein the elongated coupling body of the stem is disposed within the liner cavity and engaging the internal portion of the liner along the internal cuff face at the end of the liner, the elongated coupling body of the stem extending toward the elongated flexible corrugated ribbed portion adjacent to the terminal rigid elongated cuff.

9. The fittings assembly of claim 1, wherein the stem comprises a rim having a radius extending from a face of the stem, the rim engaging a terminal face of the liner at the end of the liner.

10. The fittings assembly of claim 1, wherein the stem comprises a coupling architecture defined by a first rim and a second rim disposed on opposite sides of and defining a coupling groove, the first rim and second rim having a radius extending from a face of the stem,
  wherein the first rim engages a terminal face of the liner at the end of the liner,
  wherein the lip of the ferrule at the first ferrule end extends into and is coupled within the coupling groove defined by the first rim and second rim.

11. The fittings assembly of claim 10, wherein an internal face of the lip of the ferrule engages a terminal end of the end portion of one or more braid layer that extends past the terminal face of the liner at the end of the liner and without the internal face of the lip of the ferrule engaging the terminal face of the liner at the end of the liner.

12. A fittings assembly comprising:
  a fuel tank liner; and
  a fitting comprising:
    an elongated stem including
      a first stem end and a second stem end, and
      an elongated coupling body at the second stem end coupled within a cavity defined by an end of the fuel tank liner, the end of the fuel tank liner defined by a connector portion having a first smaller diameter that enlarges to a second larger diameter, via a taper portion of the fuel tank liner, to a tubing portion having the second larger diameter; and
    a ferrule including:
      a ferrule body having a first ferrule end and a second ferrule end;
      a lip defining a coupling orifice at the first ferrule end with the stem being operable to extend through the coupling orifice and engaging the lip, and
      a ferrule cavity defined by the ferrule body that extends between the first and second ferrule ends and opening to the coupling orifice at the first ferrule end and a ferrule opening at the second ferrule end, the ferrule cavity surrounding the end of the fuel tank liner.

13. The fittings assembly of claim 12, wherein an internal face of the ferrule body defines at least one of a toothed profile or cleats that extend into the ferrule cavity.

14. The fittings assembly of claim 12, wherein the stem comprises a coupling groove defined by a coupling architecture of the stem.

15. The fittings assembly of claim 14, wherein the lip of the ferrule is configured to extend into and be coupled within the coupling groove defined by the coupling architecture of the stem by crimping the ferrule.

16. The fittings assembly of claim 12, wherein the stem further defines a bore that extends from the first stem end to the second stem end.

17. The fittings assembly of claim 12, wherein the fuel tank liner comprises:
  a plurality of separate elongated rigid tubing portions having a first diameter,
  a plurality of separate connector portions having a second diameter that is smaller than the first diameter, and
  taper portions disposed between and coupling successive separate tubing portions and connector portions.

* * * * *